US012490209B2

(12) United States Patent
You et al.

(10) Patent No.: US 12,490,209 B2
(45) Date of Patent: Dec. 2, 2025

(54) METHOD FOR IAB OPERATION HAVING MULTIPLE RX TIMINGS, AND NODE USING SAME

(71) Applicant: LG ELECTRONICS INC., Seoul (KR)

(72) Inventors: Hyangsun You, Seoul (KR); Hyunsoo Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 444 days.

(21) Appl. No.: 17/797,371

(22) PCT Filed: Feb. 10, 2021

(86) PCT No.: PCT/KR2021/001809
§ 371 (c)(1),
(2) Date: Aug. 3, 2022

(87) PCT Pub. No.: WO2021/162465
PCT Pub. Date: Aug. 19, 2021

(65) Prior Publication Data
US 2023/0065102 A1 Mar. 2, 2023

(30) Foreign Application Priority Data

Feb. 11, 2020 (KR) .......................... 10-2020-0016071
Jan. 15, 2021 (KR) .......................... 10-2021-0006157

(51) Int. Cl.
*H04W 56/00* (2009.01)
(52) U.S. Cl.
CPC .............................. *H04W 56/0015* (2013.01)
(58) Field of Classification Search
CPC . H04W 56/0015; H04W 56/00; H04W 84/04; H04W 56/001; H04W 56/0005; H04W 84/047

(Continued)

(56) References Cited

U.S. PATENT DOCUMENTS 11,778,676 B2 * 10/2023 Abedini .................. H04W 8/24
370/329
12,143,998 B2 * 11/2024 Park ...................... H04L 5/0053
(Continued)

FOREIGN PATENT DOCUMENTS

WO 2019/194737 A1 10/2019

OTHER PUBLICATIONS

"3rd Generation Partnership Project; Technical Specification Group Radio Access Network; NR; Study on Integrated Access and Backhaul; (Release 16)", 3GPP TR 38.874 V16.0.0, (Dec. 2018), see sections 7.2.1 and 7.4.

(Continued)

*Primary Examiner* — Jae Y Lee
*Assistant Examiner* — Haeshil Jessica Choi
(74) *Attorney, Agent, or Firm* — BRYAN CAVE LEIGHTON PAISNER LLP

(57) ABSTRACT

The present specification provides a method for performing an integrated access and backhaul (IAB) operation by an IAB node in a wireless communication system, and an apparatus therefor, the method comprising: performing an initial access operation with another node; receiving uplink reception timing information of a child IAB node of the IAB node from the other node; and performing the IAB operation on the basis of the uplink reception timing information, wherein the uplink reception timing information is information related to whether a distributed unit (DU) operation of the child IAB node and a mobile terminal (MT) operation of the child IAB node can be simultaneously performed with respect to at least one time resource.

5 Claims, 32 Drawing Sheets

(58) Field of Classification Search
USPC .......................................................... 370/350
See application file for complete search history.

(56) References Cited

U.S. PATENT DOCUMENTS

| 2019/0350023 | A1  | 11/2019 | Novlan et al. |            |
|--------------|-----|---------|---------------|------------|
| 2021/0250941 | A1* | 8/2021  | Tiirola       | H04W 40/22 |
| 2023/0034003 | A1* | 2/2023  | Kurita        | H04W 92/20 |
| 2023/0345553 | A1* | 10/2023 | Maya          | H04W 56/0045 |

OTHER PUBLICATIONS

ZTE, "TP for Timing Delta MAC CE", R2-1916538, 3GPP TSG-RAN WG2 Meeting #108, Reno, Nevada, USA, Nov. 18-22, 2019, see section 2.

NTT DOCOMO, Inc., "Mechanism to support the "case-1" OTA timing alignment", R1-1911167, 3GPP TSG RAN WG1 Meeting #98bis, Chongqing, China, Oct. 14-20, 2019, see sections 2-2.3.

* cited by examiner

FIG. 24 transmit the uplink reception timing information
for the child IAB node of
the IAB node to the IAB node
(the uplink reception timing information
may be information related to whether
simultaneous operation of a DU (distributed unit)
operation of the child IAB node
and a mobile terminal (MT) operation of
the child IAB node is possible with respect
to at least one time resource) — S2410

METHOD FOR IAB OPERATION HAVING MULTIPLE RX TIMINGS, AND NODE USING SAME

This application is the National Stage filing under 35 U.S.C. 371 of International Application No. PCT/KR2021/001809, filed on Feb. 10, 2021, which claims the benefit of and priority to Korean Application No. 10-2020-0016071, filed on Feb. 11, 2020 and Korean Application No. 10-2021-0006157, filed on Jan. 15, 2021, the contents of which are all hereby incorporated by reference herein in their entirety.

BACKGROUND OF THE DISCLOSURE

Field of the Disclosure

The present specification relates to wireless communication.

Related Art

As a wider range of communication devices require larger communication capacities, the need for mobile broadband communication that is more enhanced than the existing Radio Access Technology (RAT) is rising. Additionally, massive Machine Type Communications (massive MCT), which connects multiple devices and objects so as to provide various services regardless of time and place, is also one of the most important issues that are to be considered in the next generation communication. Moreover, discussions are made on services/terminals (or user equipment (UE)) that are sensitive to reliability and latency. And, discussions are made on the adoption of a next generation radio access technology that is based on the enhanced mobile broadband communication, massive MTC, Ultra-Reliable and Low Latency Communication (URLLC), and so on. And, for convenience, the corresponding technology will be referred to as a new radio access technology (new RAT or NR).

On the other hand, integrated access and backhaul link may be provided. Hereinafter, in this specification, features for Integrated Access Backhaul (IAB) will be provided.

SUMMARY OF THE DISCLOSURE

Technical Solutions

According to an embodiment of the present specification, a method for receiving, from another node, uplink reception timing information for a child IAB node of a IAB node, where the uplink reception timing information is information related to whether simultaneous operation of a distributed unit (DU) operation of the child IAB node and a mobile terminal (MT) operation of the child IAB node is possible for at least one time resource may be provided.

Effects of the Disclosure

According to the present specification, it is possible for the parent-DU to obtain Rx timing information for the IAB DU and determine the resource available for transmission/reception with the MT.

The effects that can be obtained through a specific example of the present specification are not limited to the effects listed above. For example, there may be various technical effects that a person having ordinary skill in the related art can understand or derive from the present specification. Accordingly, specific effects of the present specification are not limited to those explicitly described in the present specification, and may include various effects that can be understood or derived from the technical features of the present specification.

BRIEF DESCRIPTION OF THE DRAWINGS

FIG. 24 is a flowchart of a method for transmitting uplink reception timing information (from the point of view of a parent node).

DESCRIPTION OF EXEMPLARY EMBODIMENTS

In the present specification, "A or B" may mean "only A", "only B" or "both A and B". In other words, in the present specification, "A or B" may be interpreted as "A and/or B". For example, in this specification, "A, B or C" refers to "only A", "only B", "only C", or "any combination of A, B and C".

A forward slash (/) or comma used herein may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" can be interpreted the same as "at least one of A and B".

In addition, in the present specification, "at least one of A, B and C" means "only A", "only B", "only C", or "any combination of A, B and C". In addition, "at least one of A, B or C" or "at least one of A, B and/or C" can mean "at least one of A, B and C".

In addition, parentheses used in the present specification may mean "for example". Specifically, when described as "control information (PDCCH)", "PDCCH" may be proposed as an example of "control information". In other words, "control information" of the present specification is not limited to "PDCCH", and "PDCCH" may be suggested as an example of "control information". In addition, even when described as "control information (i.e., PDCCH)", "PDCCH" may be proposed as an example of "control information".

In the present specification, technical features that are individually described in one drawing may be implemented individually or at the same time.

Figure 1:
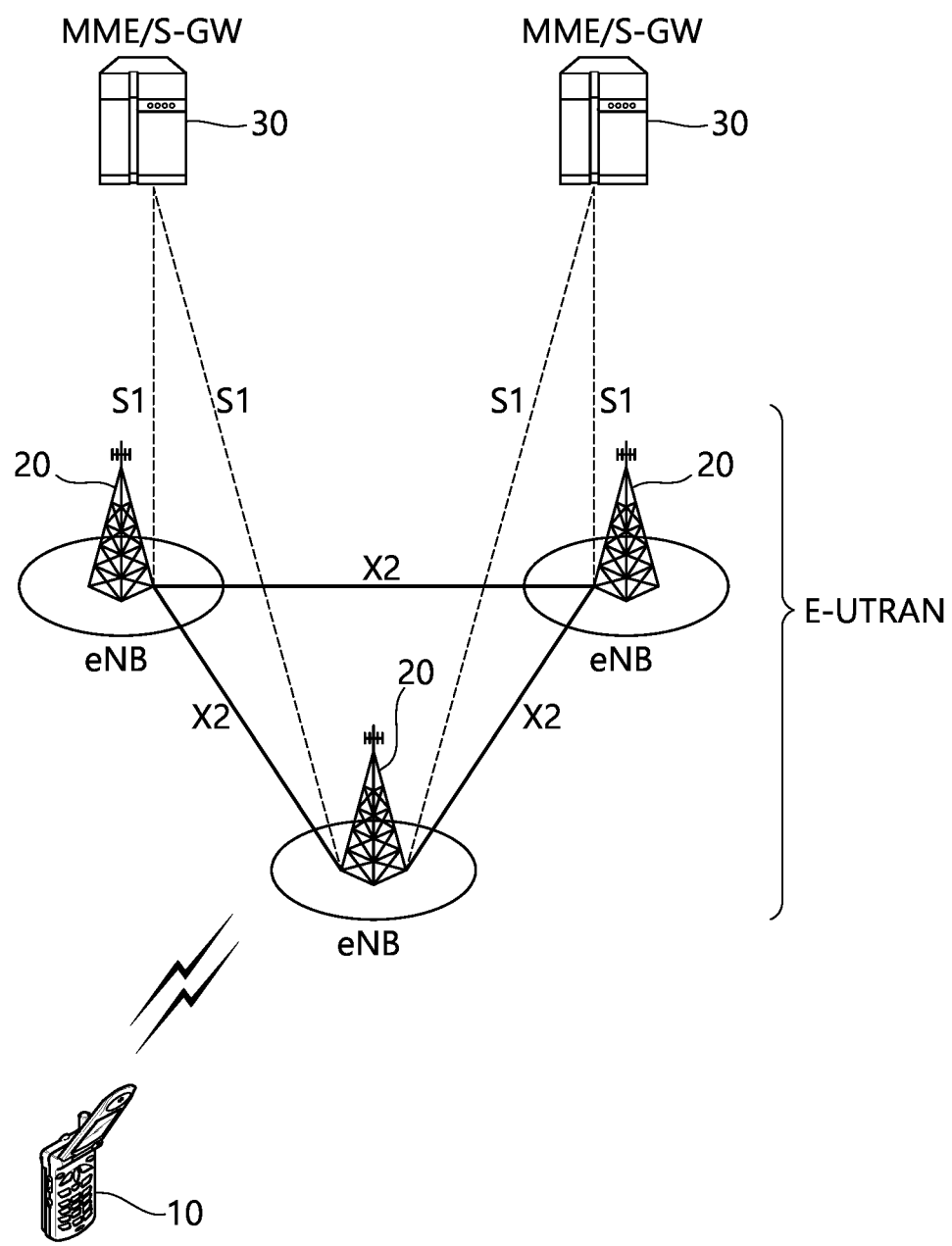
FIG. 1 illustrates a wireless communication system.

FIG. 1 illustrates a wireless communication system. The wireless communication system may also be referred to as an evolved-UMTS terrestrial radio access network (E-UTRAN), or long term evolution (LTE)/LTE-A system.

The E-UTRAN includes at least one base station (BS) (20) which provides a control plane and a user plane to a user equipment (UE) (10). The UE (10) may be fixed or mobile, and may be referred to as another terminology, such as a mobile station (MS), a user terminal (UT), a subscriber station (SS), a mobile terminal (MT), a wireless device, and so on. The BS (20) is generally a fixed station that communicates with the UE (10) and may be referred to as another terminology, such as an evolved node-B (eNB), a base transceiver system (BTS), an access point, and so on.

The BSs (20) are interconnected by means of an X2 interface. The BSs (20) are also connected by means of an S1 interface to an evolved packet core (EPC) (30), more specifically, to a mobility management entity (MME) through S1-MME and to a serving gateway (S-GW) through S1-U.

The EPC (30) includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
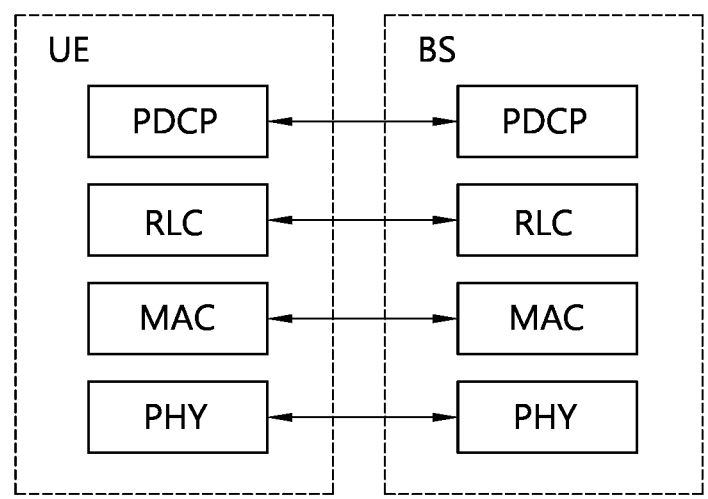
FIG. 2 is a diagram showing a wireless protocol architecture for a user plane.
Figure 3:
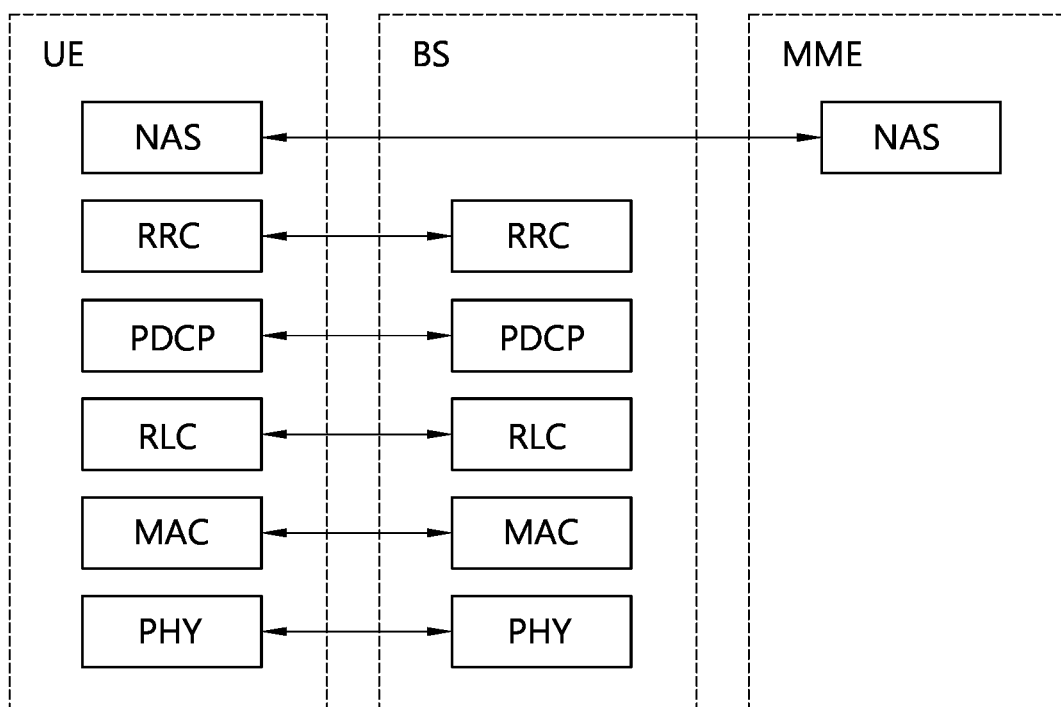
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As a wider range of communication devices require larger communication capacities, the need for mobile broadband communication that is more enhanced than the existing Radio Access Technology (RAT) is rising. Additionally, massive Machine Type Communications (massive MCT), which connects multiple devices and objects so as to provide various services regardless of time and place, is also one of the most important issues that are to be considered in the next generation communication. Moreover, discussions are made on services/terminals (or user equipment (UE)) that are sensitive to reliability and latency. And, discussions are made on the adoption of a next generation radio access technology that is based on the enhanced mobile broadband communication, massive MTC, Ultra-Reliable and Low Latency Communication (URLLC), and so on. And, for convenience, the corresponding technology will be referred to as a new RAT or NR.

Figure 4:
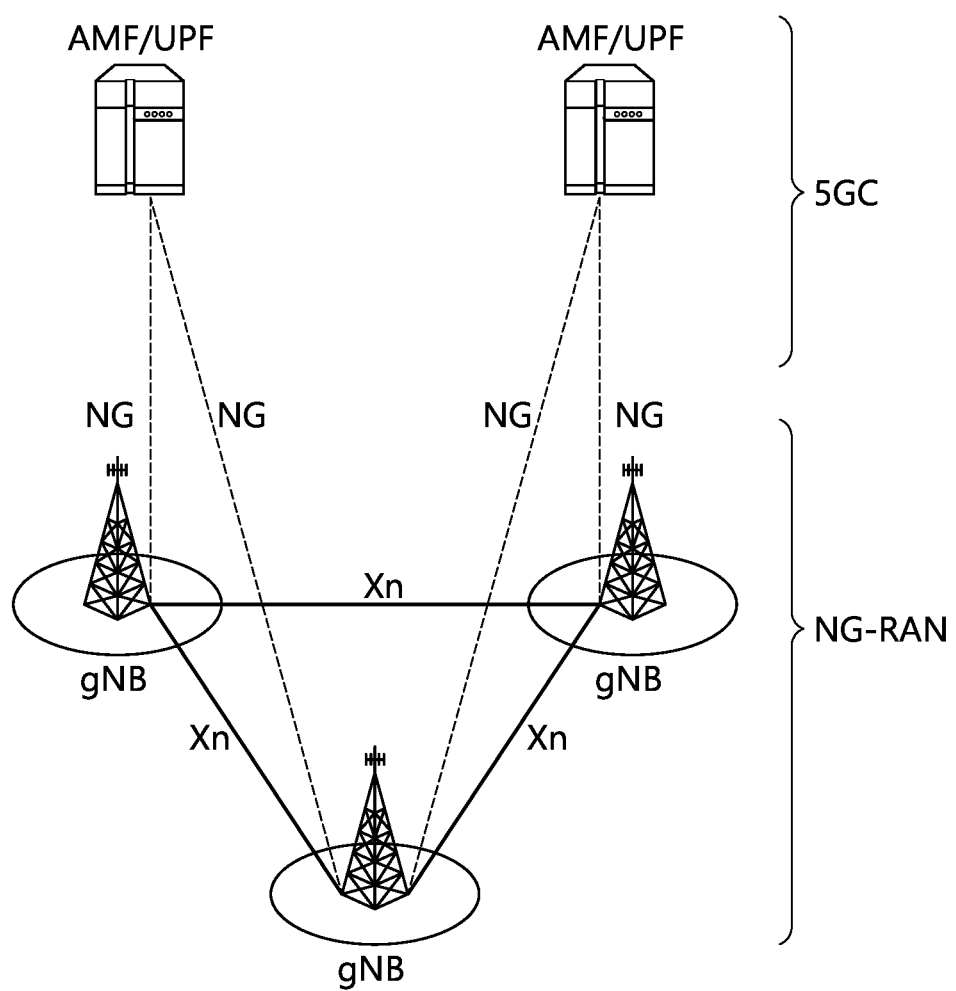
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, the NG-RAN may include a gNB and/or an eNB providing a user plane and a control plane protocol termination to a terminal. FIG. 4 illustrates a case of including only the gNB. The gNB and eNB are connected to each other by an Xn interface. The gNB and eNB are connected to a 5G Core Network (5GC) through an NG interface. More specifically, the gNB and eNB are connected to the access and mobility management function (AMF) through an NG-C interface and connected to a user plane function (UPF) through an NG-U interface.

Figure 5:
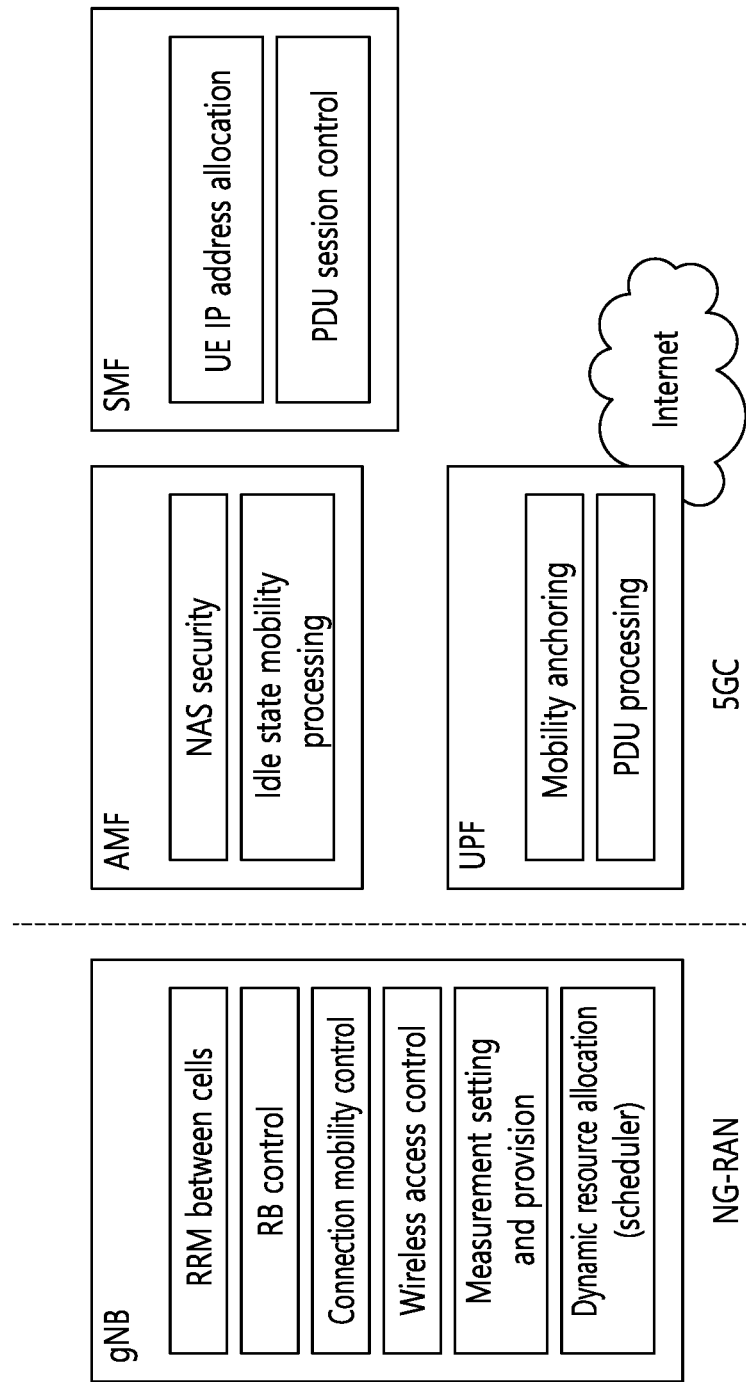
FIG. 5 illustrates functional partitioning between NG-RAN and 5GC.

FIG. 5 illustrates functional partitioning between NG-RAN and 5GC.

Referring to FIG. 5, the gNB may provide inter-cell radio resource management (RRM), radio bearer (RB) control, connection mobility control, radio access control, measurement configuration & provision, dynamic resource allocation, and the like. An AMF may provide functions such as NAS security, idle state mobility handling, and the like. A UPF may provide functions such as mobility anchoring, PDU handling, and the like. A session management function (SMF) may provide functions such as UE IP address allocation, PDU session control, and the like.

Figure 6:
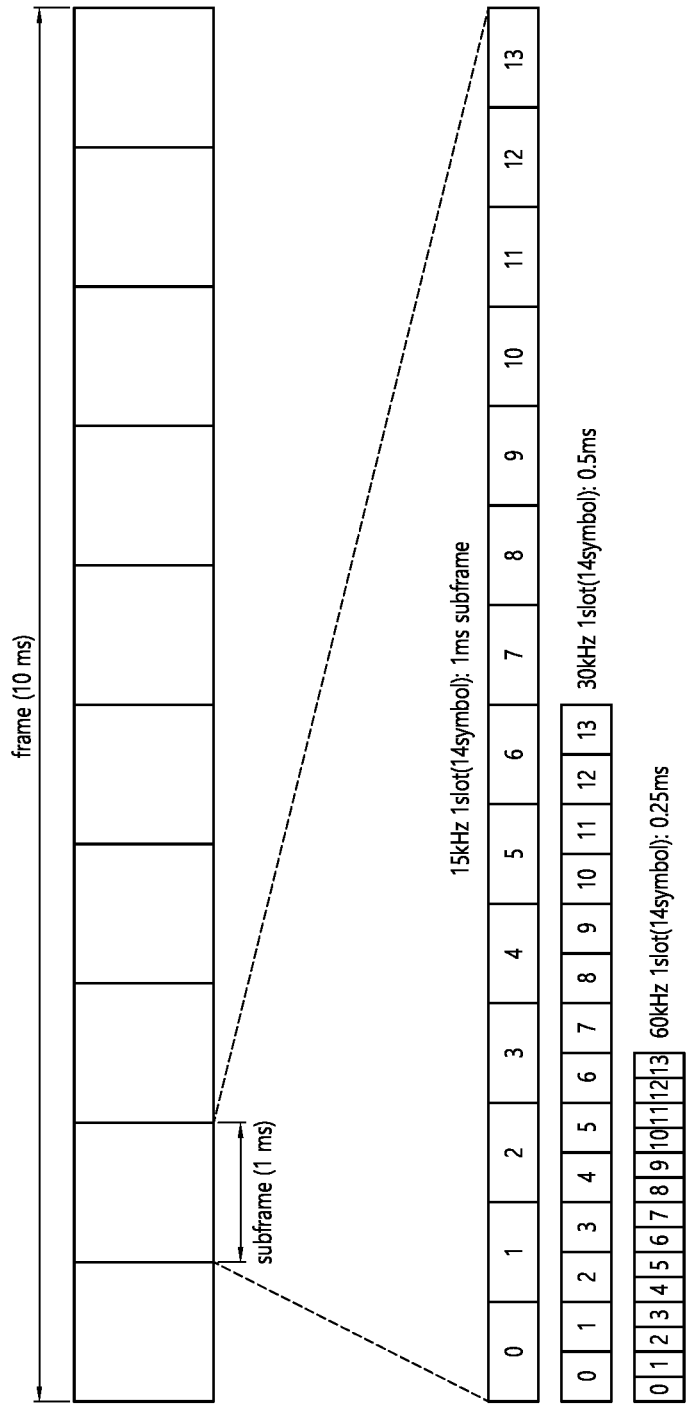
FIG. 6 illustrates a frame structure applicable in NR.

FIG. 6 illustrates a frame structure applicable in NR.

Referring to FIG. 6, a frame may consist of 10 milliseconds (ms) and may include 10 subframes of 1 ms.

A subframe may include one or a plurality of slots according to subcarrier spacing.

Table 1 below shows subcarrier spacing configuration p.

TABLE 1

| $\mu$ | $\Delta f = 2^\mu \cdot 15$ [kHz] | CP(Cyclic Prefix) |
|---|---|---|
| 0 | 15 | Normal |
| 1 | 30 | Normal |
| 2 | 60 | Normal, Extended |
| 3 | 120 | Normal |
| 4 | 240 | Normal |

Table 2 below shows the number of slots in a frame ($N^{frame,\mu}_{slot}$), the number of slots in a subframe ($N^{subframe,\mu}_{slot}$), and the number of symbols in a slot ($N^{slot}_{symb}$) according to the subcarrier spacing configuration $\mu$.

TABLE 2

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 6 shows $\mu$=0, 1, and 2.

A physical downlink control channel (PDCCH) may include one or more control channel elements (CCEs) as shown in Table 3 below.

TABLE 3

| Aggregation level | Number of CCEs |
|---|---|
| 1 | 1 |
| 2 | 2 |
| 4 | 4 |
| 8 | 8 |
| 16 | 16 |

In other words, the PDCCH may be transmitted through a resource including 1, 2, 4, 8 or 16 CCEs. Here, the CCE includes six resource element groups (REGs), and one REG includes one resource block in the frequency domain and one orthogonal frequency division multiplexing (OFDM) symbol in the time domain. The following technologies/characteristics may be applied to NR.

<Self-Contained Subframe Structure>

Figure 7:
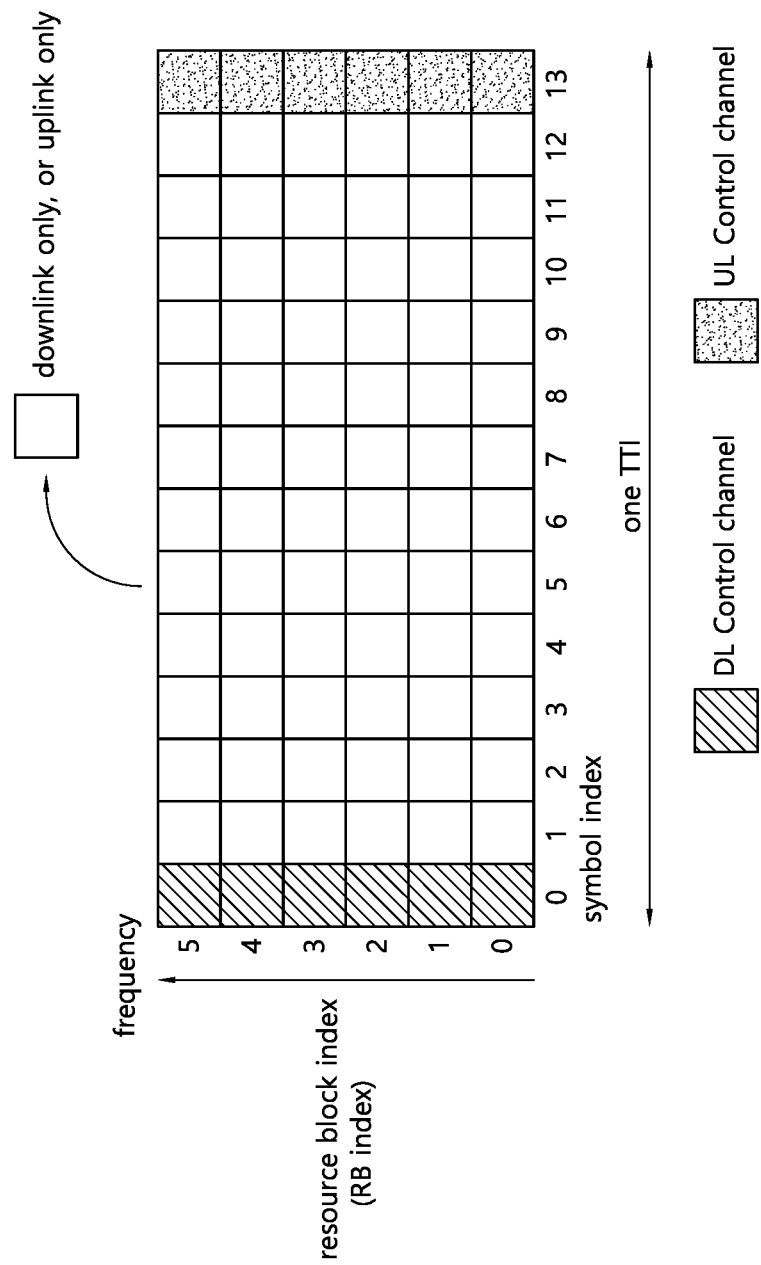
FIG. 7 illustrates an example of a frame structure for the new radio access technology (new RAT).

FIG. 7 illustrates an example of a frame structure for the new radio access technology (new RAT).

In NR, as a purpose for minimizing latency, as shown in FIG. 7, a structure having a control channel and a data channel being processed with Time Division Multiplexing (TDM), within one TTI, may be considered as one type of frame structure.

In FIG. 7, an area marked with slanted lines represents a downlink control area, and an area marked in black represents an uplink control area. An area marked in black may be used for downlink (DL) data transmission or may be used for uplink (UL) data transmission. The characteristic of such structure is that, since downlink (DL) transmission and uplink (UL) transmission are carried out sequentially, DL data is sent out (or transmitted) from a subframe, and UL Acknowledgement/Not-acknowledgement (ACK/NACK) may also be received in the subframe. As a result, time needed until data retransmission, when a data transmission error occurs, may be reduced, and, accordingly, latency in the final data transfer (or delivery) may be minimized.

In the above-described data and control TDMed subframe structure, a time gap is needed for a transition process (or shifting process) from a transmission mode to a reception mode of the base station and UE, or a transition process (or shifting process) from a reception mode to a transmission mode of the base station and UE. For this, in a self-contained subframe structure, some of the OFDM symbols of a time point where a transition from DL to UL occurs may be configured as a guard period (GP).

Figure 8:
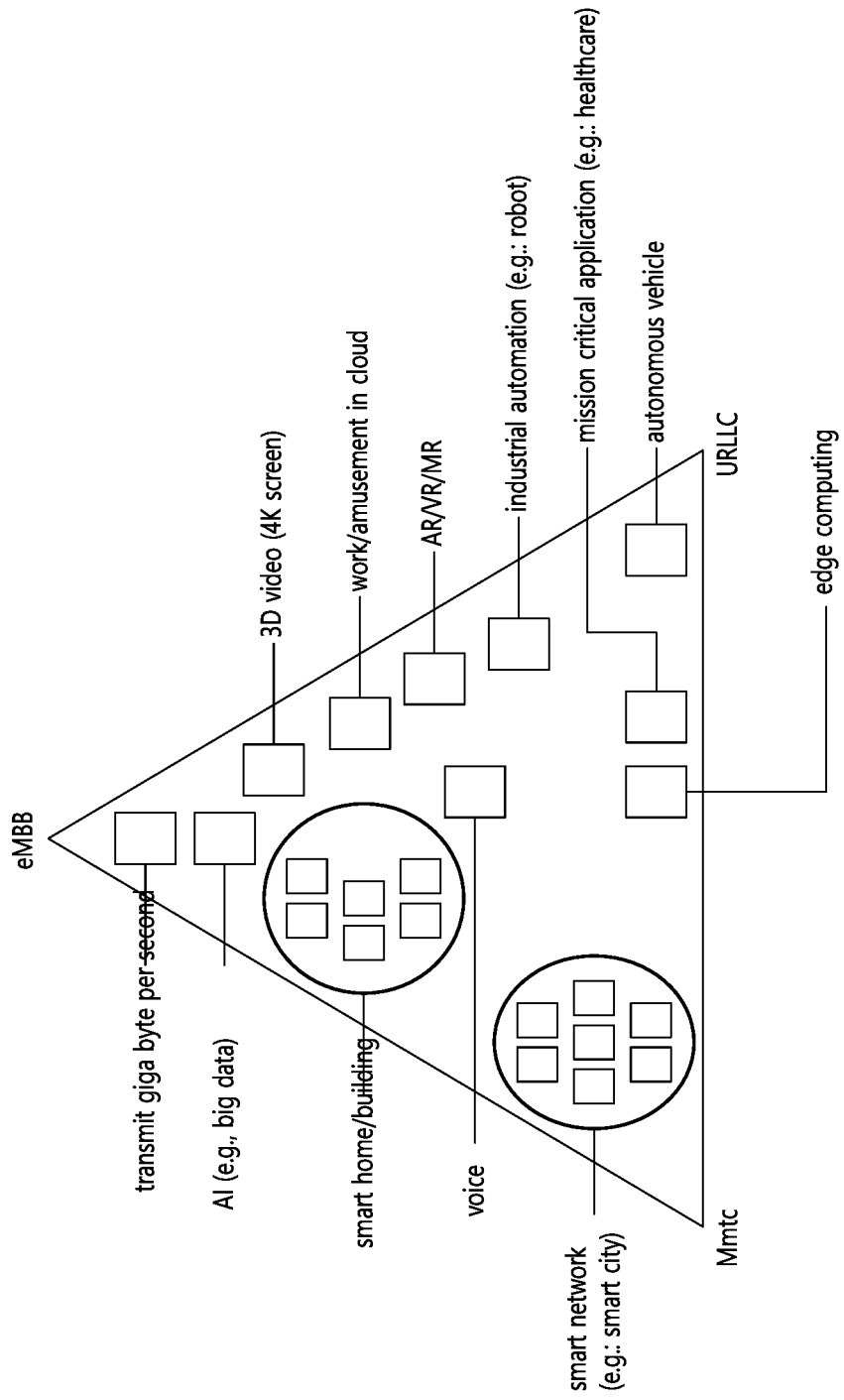
FIG. 8 shows examples of 5G usage scenarios to which the technical features of the present specification can be applied.

FIG. 8 shows examples of 5G usage scenarios to which the technical features of the present specification can be applied. The 5G usage scenarios shown in FIG. 8 are only exemplary, and the technical features of the present specification can be applied to other 5G usage scenarios which are not shown in FIG. 8.

Referring to FIG. 8, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of use cases included in the triangle of FIG. 8 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location-based information systems. Use cases of logistics and freight tracking typically require low data rates, but require a large range and reliable location information.

Figure 9:
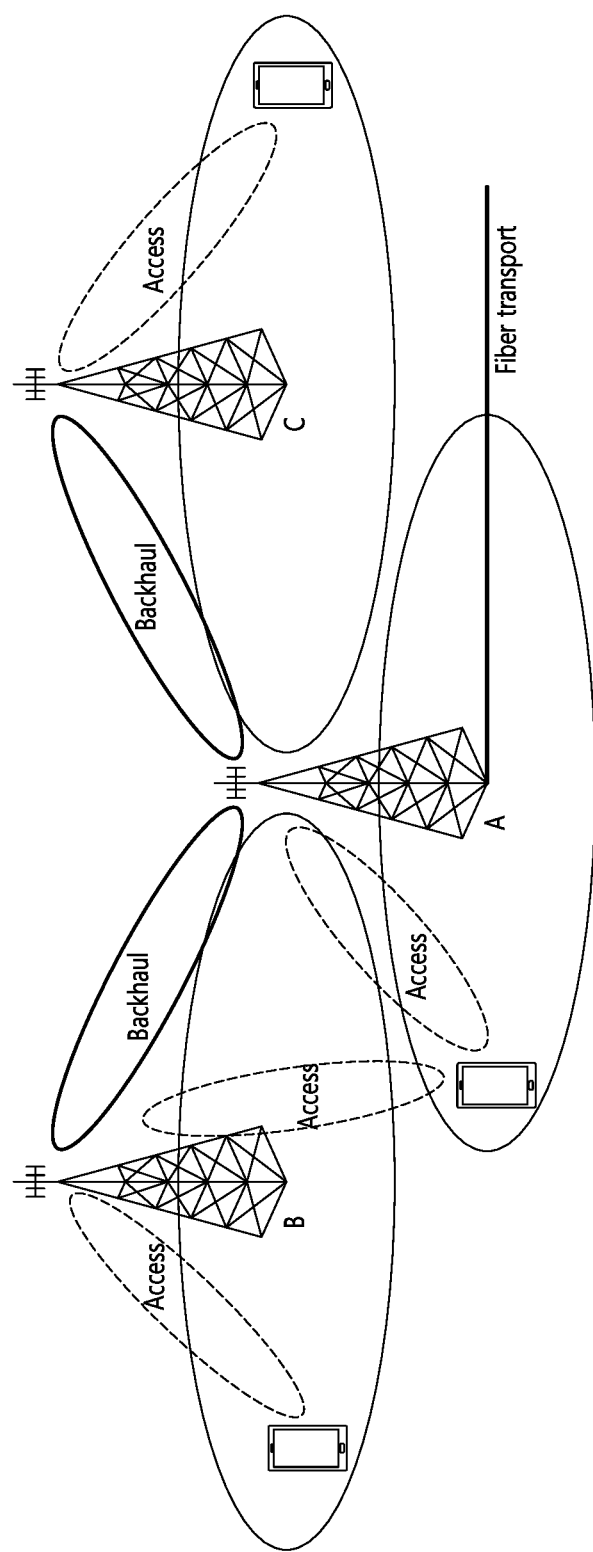
FIG. 9 schematically illustrates an example of integrated access and backhaul links.

FIG. 9 schematically illustrates an example of integrated access and backhaul links.

An example of a network having such integrated access and backhaul links is shown in FIG. 9. Here, a relay node (rTRP) can multiplex access and backhaul links in time, frequency or space (e.g., beam based operation).

Operations of different links may be at the same frequency or different frequencies (which may also be referred to as "in-band" and "out-band" relays). Although efficient support of the out-band relay is important in some NR deployment scenarios, it is very important to understand in-band operation requirements that mean a close interaction with an access link operating at the same frequency in order to accept duplex constraint and prevent/mitigate interference.

In addition, operation of an NR system in mmWave spectrum can present some unique challenges including experiencing serious short-term blocking that may not be easily mitigated by a current RRC based handover mechanism due to a larger time scale necessary to complete a procedure than short-term blocking.

To overcome short-term blocking in the mmWave system, a fast RAN based mechanism (which does not necessarily require intervention of a core network) for switching between rTRPs.

Necessity for mitigating short-term blocking for NR operation in the mmWave spectrum along with requirement for easier deployment of a self-backhauled NR cell may cause necessity of development of an integrated framework that enables rapid switching of access and backhaul links.

In addition, over-the-air (OTA) coordination between rTRPs can be regarded as mitigation of interference and support of end-to-end route selection and optimization.

The following requirements and aspects may need to be solved by integrated access and backhaul (IAB) for NR.
  Efficient and flexible operation for in-band and out-band relays in indoor and outdoor scenarios
  Multiple hops and redundant connection
  End-to-end route selection and optimization
  Support of backhaul link with high spectrum efficiency
  Legacy NR UE support Legacy new RAT was designed to support half-duplex devices. Further, half-duplex of an IAB scenario deserves to be supported and to become an object. In addition, a full-duplex IAB device can be researched.

In the IAB scenario, a donor gNB (DgNB) needs to schedule all links between related relay nodes (RNs) and UEs unless each RN has scheduling capability. In other words, the DgNB can collect traffic information in all related RNs, determine schedules with respect to all links and then notify each RN of schedule information.

Figure 10:
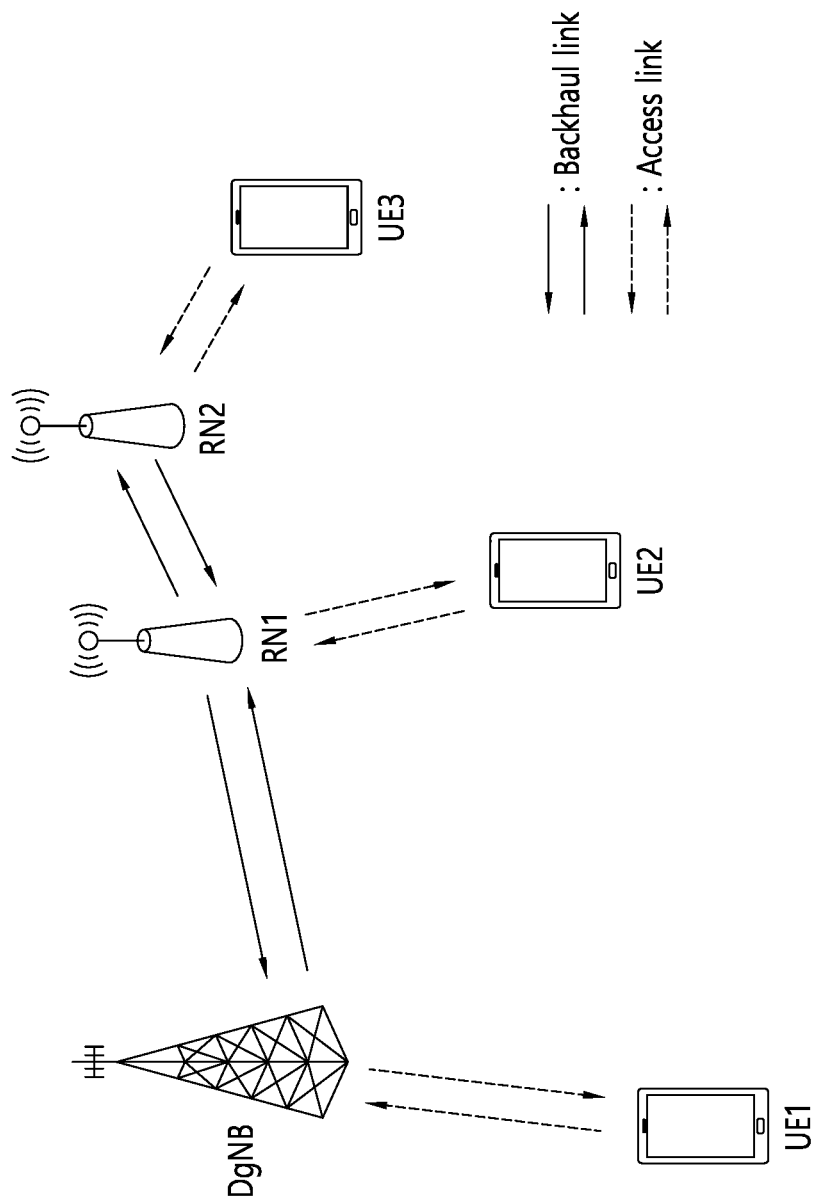
FIG. 10 schematically illustrates an example of a link between a DgNB, an RN, and a UE.

FIG. 10 schematically illustrates an example of a link between a DgNB, an RN, and a UE.

According to FIG. 10, for example, a link between DgNB and UE1 is an access link (access link), a link between RN1 and UE2 is also an access link, and a link between RN2 and UE3 may also mean an access link.

Similarly, according to FIG. 10, for example, a link between DgNB and RN1 and a link between RN1 and RN2 may mean a backhaul link.

For example, backhaul and access links can be configured, and in this case, the DgNB can receive scheduling requests of UE 2 and UE 3 as well as a scheduling request of UE 1. Then, the DgNB can determine scheduling of two backhaul links and three access links and signal the scheduling result. Accordingly, this centralized scheduling includes delayed scheduling and waiting time problems.

On the other hand, distributed scheduling can be performed if each RN has scheduling capability. Then, immediate scheduling can be performed for an uplink scheduling request of a UE and backhaul/access links can be used more flexibly in response to surrounding traffic conditions.

Figure 11:
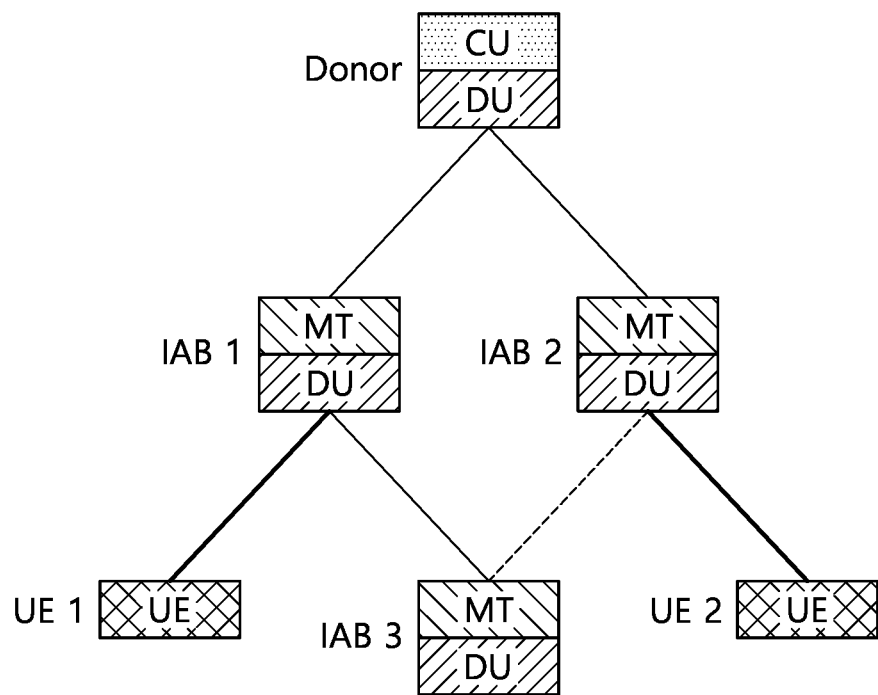
FIG. 11 schematically shows an example of a backhaul link and an access link.

FIG. 11 schematically shows an example of a backhaul link and an access link.

As shown in FIG. 11, a link between a donor node and an IAB node or a link between IAB nodes is called a backhaul link. On the other hand, the link between the donor node and the UE or the link between the IAB node and the UE is called an access link. That is, a link between an MT and a parent DU or a link between a DU and a child MT may be referred to as a backhaul link, and a link between the DU and the UE may be referred to as an access link.

Based on this discussion, below, an operation when a DU of an IAB node has multiple UL Rx timings and an operation when an MT has multiple UL Tx timings are proposed.

Figure 12:
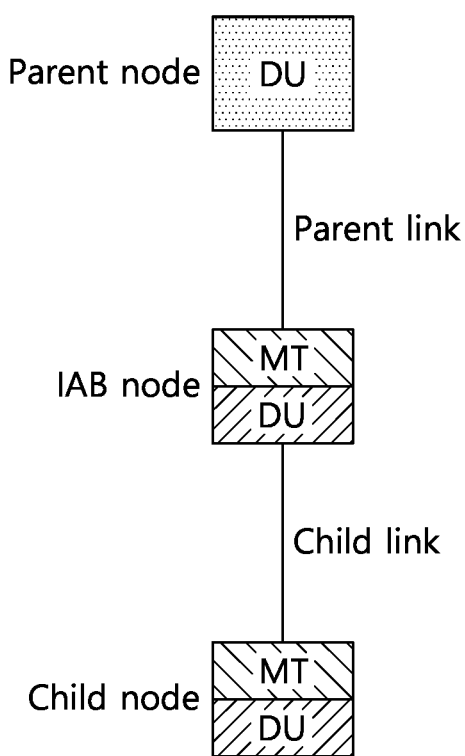
FIG. 12 schematically shows an example of a parent link and a child link.

In the existing IAB node, the DU and the MT performed TDM operation through different time resources. On the other hand, it is required to perform resource multiplexing of SDM/FDM, FD (full duplexing), etc. between the DU and the MT for efficient resource management. FIG. 12, the link between the IAB node (IAB MT) and the parent node (parent DU) is referred to as a parent link, a link between an IAB node (IAB DU) and a child node (child MT) is called a child link. At this time, the TDM operation between the parent link and the child link has been previously discussed, and the SDM/FDM and FD operation are being discussed.

FIG. 12 schematically shows an example of a parent link and a child link.

As shown in FIG. 12, the link between the IAB node and the parent node is called a parent link, and the link between the IAB node and the child node/UE is called a child link. That is, the link between the MT and the parent DU is called a parent link, and the link between the DU and the child MT/UE is called a child link.

However, depending on the interpretation or perspective, the link between the IAB node and the parent node is called a backhaul link, and the link between the IAB node and the child node/UE is also called an access link.

The Tx/Rx timing alignment method of the IAB node that can be considered in the IAB environment may be as follows.

Figure 13:
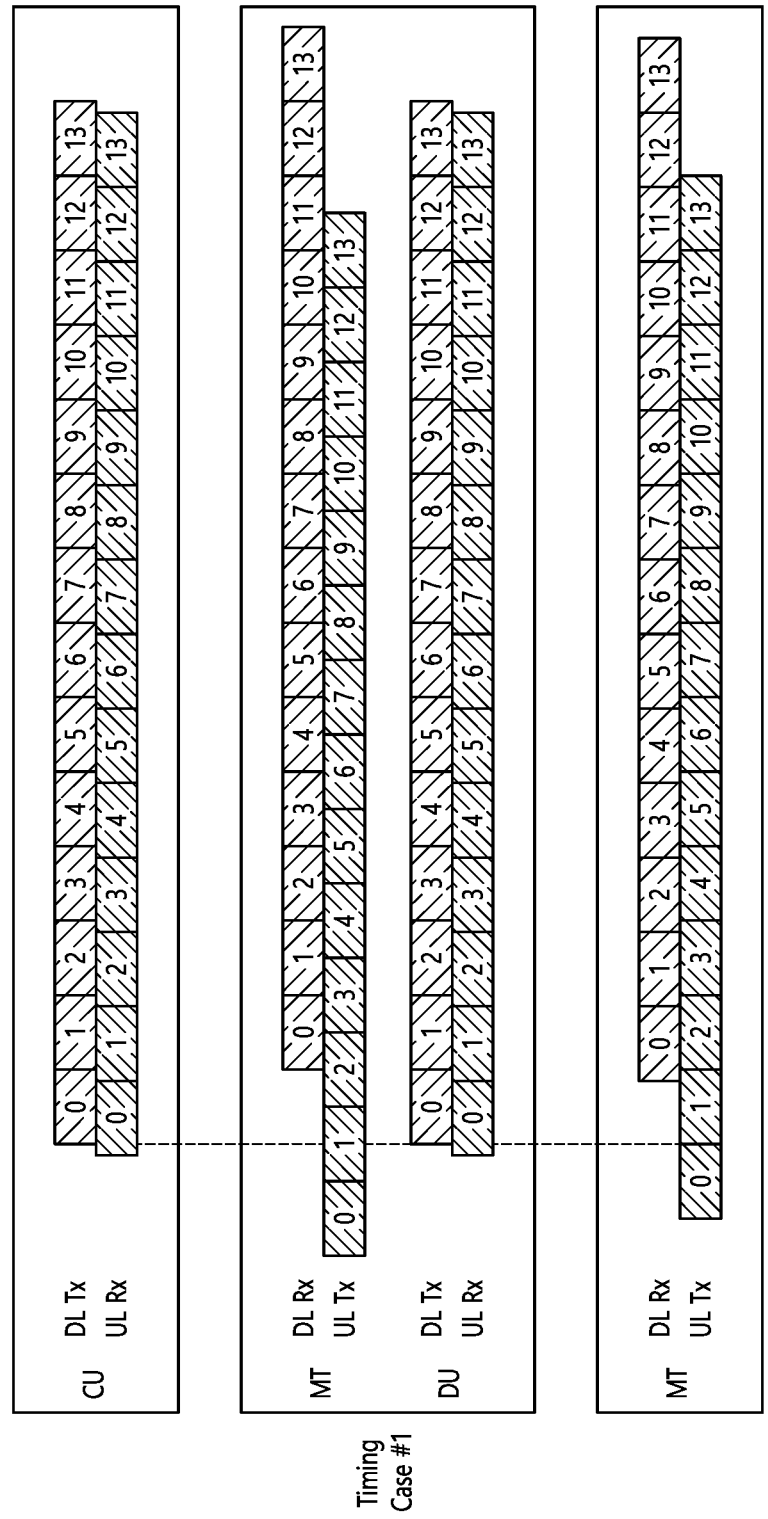
FIG. 13 schematically shows an example of timing alignment case 1.

FIG. 13 schematically shows an example of timing alignment case 1.

Timing Alignment Case 1

DL transmission timing alignment across IAB-node(s) and IAB-donor(s). This is a method in which the DL Tx timing of DUs between IAB nodes is aligned, and is a timing alignment method used by Rel-16 IAB nodes.

If DL TX and UL RX are not well aligned at the parent node, additional information about the alignment is needed for the child node to properly set its DL TX timing for OTA based timing & synchronization.

MT Tx timing may be expressed as MT Rx timing−TA, the DU Tx timing may be expressed as MT Rx timing−TA/2−T_delta. The T_delta value is a value obtained from the parent node.

Figure 14:
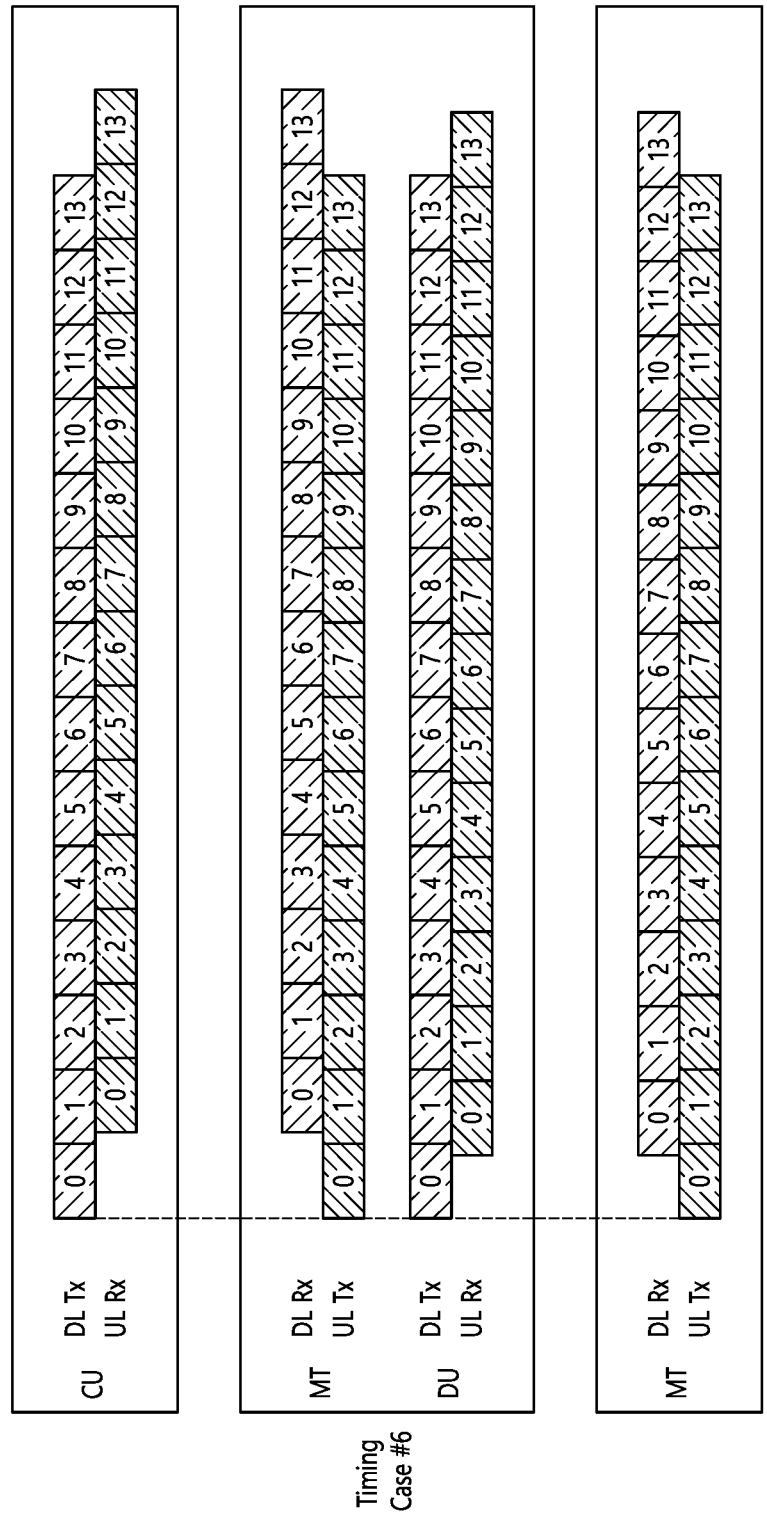
FIG. 14 schematically shows an example of timing alignment case 6.

FIG. 14 schematically shows an example of timing alignment case 6.

Timing Alignment Case 6

The DL transmission timing for all IAB-nodes is aligned with the parent IAB-node or donor DL timing. The UL transmission timing of an IAB-node can be aligned with the IAB-node's DL transmission timing.

This is a method in which the MT UL Tx timing and the DU DL Tx timing of the IAB node are aligned.

Since the UL Tx timing of the MT is fixed, the UL Rx timing of the parent DU receiving it is delayed by the propagation delay of the parent DU and the MT compared to the UL Tx timing of the MT. The UL Rx timing of the MT varies according to the child MT that transmits the UL. When the IAB node uses the timing alignment case 6, since the UL Rx timing of the parent node is different from the existing one, if the IAB node wants to use the timing alignment case 6, the parent node also needs to know the corresponding information.

Figure 15:
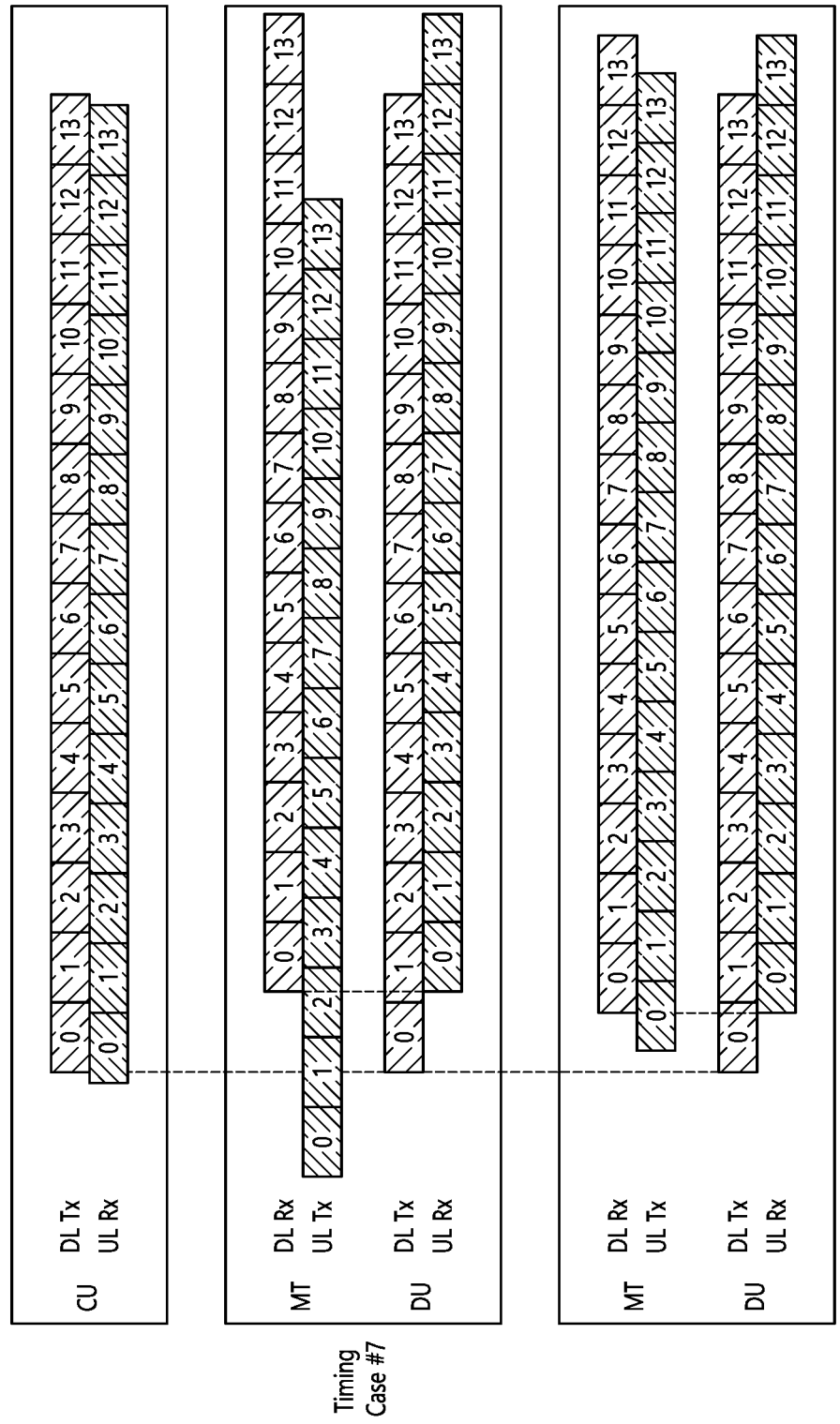
FIG. 15 schematically shows an example of a timing alignment case 7.

FIG. 15 schematically shows an example of a timing alignment case 7.

Timing Alignment Case 7

The DL transmission timing for all IAB-nodes is aligned with the parent IAB-node or donor DL timing. The UL reception timing of an IAB-node can be aligned with the IAB-node's DL reception timing.

If DL TX and UL RX are not well aligned at the parent node, additional information about the alignment is needed for the child node to properly set its DL TX timing for OTA based timing & synchronization.

This is a method in which the MT DL Rx timing and the DU UL Rx timing of the IAB node are aligned.

The transmission/reception timing from the MT perspective is the same as that of the existing IAB node (Rel-16 IAB node), the UL Rx timing of the DU may be aligned with the DL Rx timing of the MT. The IAB node needs to adjust the TA of the child MTs so that the child MTs transmit UL signals according to their UL Rx timing.

Therefore, this timing alignment method may not reveal a difference in the specification operation of the IAB node compared to the existing timing alignment method (case 1). Accordingly, the timing alignment case 7 described herein may be replaced/interpreted as the timing alignment case 1.

Examples for timing alignment cases 1, 6, and 7 are shown in FIGS. 13 to 15, respectively.

In this specification, timing alignment may mean slot-level alignment or symbol-level alignment.

Hereinafter, the proposal of the present specification will be described.

Additional advantages, objects, and features of the present disclosure will be set forth in part in the description that follows, and will become apparent to those skilled in the art upon reviewing the following, or may be learned, in part, from the practice of the disclosure. The objects and other advantages of the present specification may be realized and attained by means of the appended drawings as well as the appended claims and the structures particularly pointed out in the claims.

The configuration, operation and other features of the present specification may be understood by the embodiments of the present specification described with reference to the accompanying drawings.

The content of the present specification is described assuming an in-band environment, but may also be applied in an out-band environment. In addition, the contents of the present specification are described in consideration of an environment in which a donor gNB (DgNB), a relay node (RN), and a UE perform a half-duplex operation, the donor gNB (DgNB), the relay node (RN), and/or the UE may be applied in an environment in which a full-duplex operation is performed.

The IAB node operates with a specific Tx/Rx timing at a specific time, but may use a different Tx/Rx timing according to time/situation. In the present specification, an operation in which the IAB node applies different Tx/Rx timing according to time/situation is proposed.

Terms used in this specification may be as follows.

IAB node: a RAN node that supports radio access to the terminal(s) and supports wireless backhaul of access traffic.

IAB Donor: A RAN node that provides the core network with the UE's interface and wireless backhaul function for the IAB node(s).

Hereinafter, each abbreviation may correspond to an abbreviation of the following terms.

IAB: Integrated Access and Backhaul
CSI-RS: Channel State Information Reference Signal
DgNB: Donor gNB
AC: Access
BH: Backhaul
DU: Distributed Unit
MT: Mobile terminal
CU: Centralized Unit
IAB-MT: IAB mobile terminal
NGC: Next-Generation Core network
SA: Stand-alone
NSA: non-stand-alone
EPC: Evolved Packet Core A. IAB DU Operation with Multiple Rx Timing For a DU (DU of a donor node or an IAB node), a plurality of child MTs/UEs may be connected. In this case, links to different child MTs/UEs are divided into different child links. In the case of the existing DU, the UL Rx timing is fixed to a specific timing, and the UL Rx timings for all child links are set to be aligned. To this end, the DU sets a TA to its own child MT/UE so that UL Rx timings for a plurality of child links can be aligned.

On the other hand, in the case of an enhanced IAB node, all child links may not have the same UL Rx timing. An example of a specific situation in which the UL RX timing may be different for each child link is as follows.

When the child node applies the timing alignment case 6 (Tx timing alignment), the UL Tx timing of the child MT is aligned with the DL Tx timing of the child DU. In this case, the UL Rx timing of the DU is determined according to a propagation delay between the DU and a child node. Accordingly, the UL Rx timing of the DU may be different between UL signals transmitted by child MTs having different propagation delays.

When the timing alignment cases applied between child nodes are different, the UL Rx timing of the DU may be different according to the child MT. For example, if child node 1 uses timing alignment case 1 and child node 2 uses timing alignment case 6, child node 1 may determine UL Tx timing based on a configured TA, and child node 2 may determine UL Tx timing according to its own DL Tx timing. Therefore, the UL Rx timing of the DU may be different between the UL signals transmitted by the child MT 1 and the child MT 2.

The UL Rx timing of the DU may be different according to the capability of the child node. For example, when the DU wants to align its UL Rx timing so that the timing alignment case 7 can be applied, the child MT 1, which is the improved IAB node, may determine the UL Tx timing by adjusting the TA value according to the corresponding UL Rx timing. At this time, the TA value becomes negative, so that the UL Tx timing of the child MT 1 may be later than the DL Rx timing. Another child link of the DU may be connected to an access UE or a child node MT2, which is a legacy IAB node. In this case, the corresponding access UE or the child MT2 does not have the ability to set a negative TA value, so the UL Tx timing may always exist before the DL Rx timing. In this case, the UL Rx timing of the DU may be different between the UL signals transmitted by the 'child MT 1' and the 'access UE or child MT 2'.

In this specification, when the UL Rx timing may be different for each child link of the DU, the operation of the IAB node is proposed. In this specification, a child MT may mean an access UE.

Figure 16:
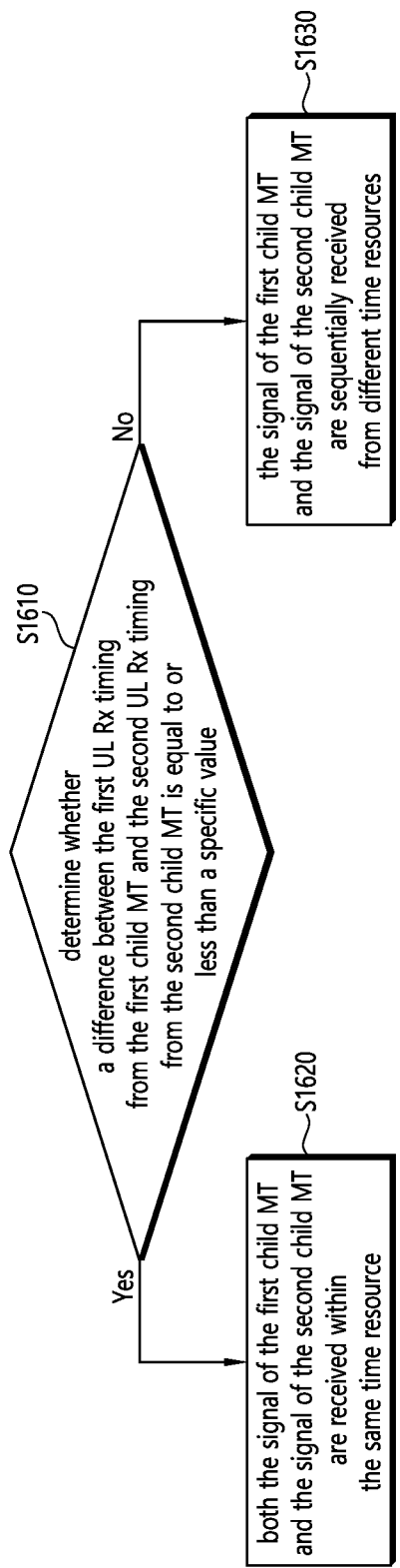
FIG. 16 shows an example of the operation of the IAB node when the UL Rx timing may be different for each child link of the DU.

FIG. 16 shows an example of the operation of the IAB node when the UL Rx timing may be different for each child link of the DU.

Referring to FIG. 16, a plurality of child MTs, for example, a first child MT and a second child MT, may be connected to the IAB node. In this case, the IAB node may determine whether a difference between the first UL Rx timing from the first child MT and the second UL Rx timing from the second child MT is equal to or less than a specific value (S1610).

As a result of the determination, when the difference between the first UL Rx timing and the second UL Rx timing is equal to or less than a specific value, both the signal of the first child MT and the signal of the second child MT are received within the same time resource (S1620). The IAB node may manage the first child MT and the second child MT in the same child MT group.

On the other hand, as a result of the determination, when the difference between the first UL Rx timing and the second UL Rx timing is greater than the specific value, the signal of the first child MT and the signal of the second child MT are sequentially received from different time resources (S1630). For example, when there is a first time resource and a second time resource that are time domain multiplexing (TDM), it may receive the signal of the first child MT in the first time resource, it may receive the signal of the second child MT in the second time resource. The IAB node may manage the first child MT and the second child MT as different child MT groups. For example, the first child MT may be managed as belonging to the first child MT group, the second child MT may be managed as belonging to the second child MT group. The IAB node may set an independent TA (timing advanced) value for each child MT group.

The specific value may be set by the network (e.g., the donor node of the IAB node is set through an RRC message or DCI) or a predetermined value.

Hereinafter, it will be described in more detail.

Figure 17:
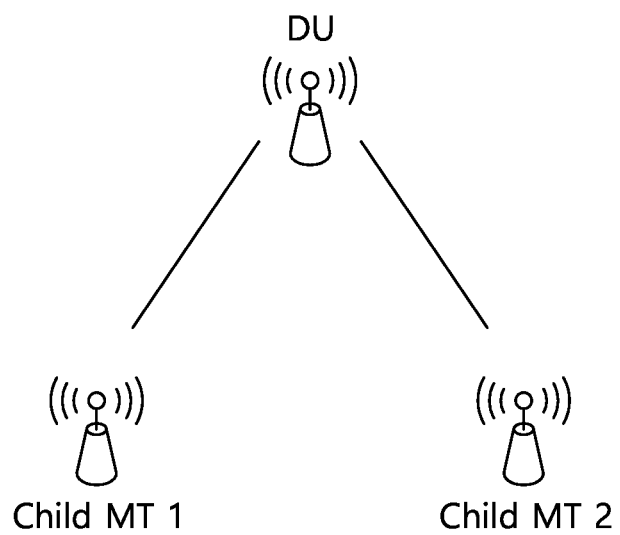
FIGS. 17 to 19 schematically show an example of a relationship between a DU and a child MT(s).
Figure 18:
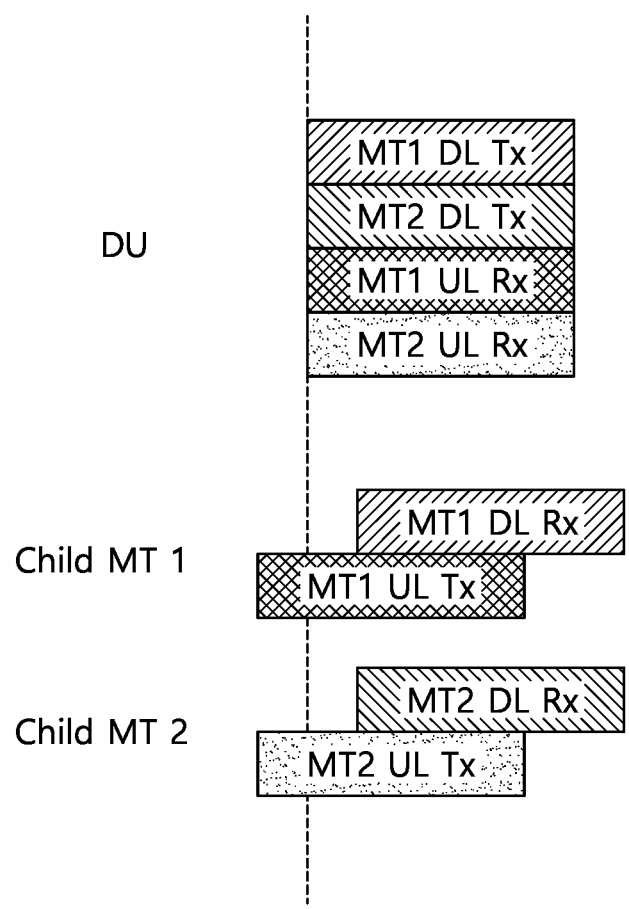
Figure 19:
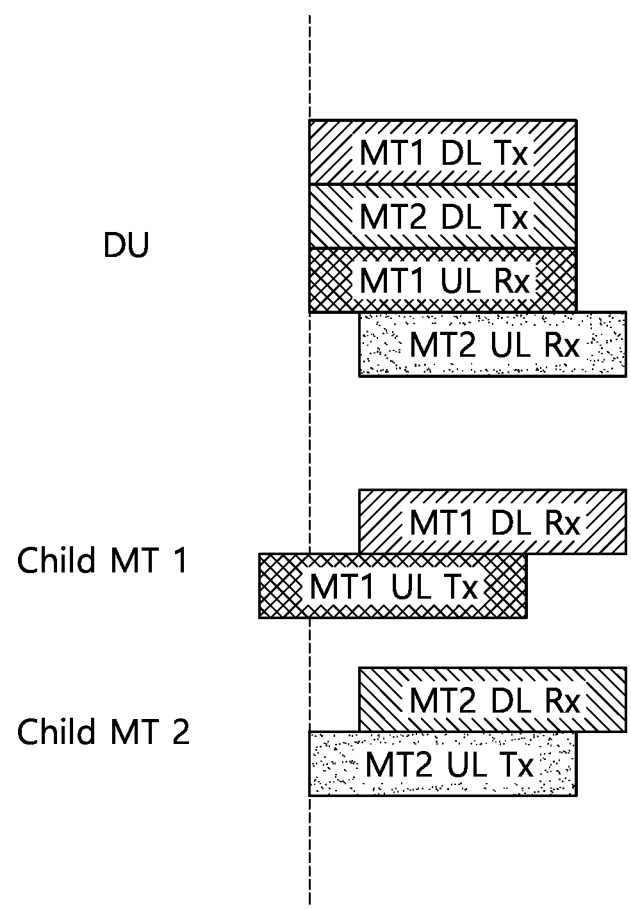

FIGS. 17 to 19 schematically show an example of a relationship between a DU and a child MT(s).

The IAB node DU may receive uplink signals transmitted by child links having the same/similar UL Rx timing through the same time resource. When the UL Rx timings between uplink signals transmitted by different child links are significantly different, all uplink signals may not be successfully received. For example, as shown in FIG. 17, when the DU has MT1 and MT2 as child MTs, as shown in FIG. 18, if the UL Rx timings from the child MT1 and the child MT2 coincide with each other or the timing difference falls within a specific value, the DU can receive both UL signals. However, as shown in FIG. 19, if the difference between the UL Rx timings from the child MT1 and the child MT2 is greater than a specific value, the DU may not receive both UL signals.

Therefore, it is preferable that the DU simultaneously receive UL signals of child links whose UL Rx timings coincide with each other or whose timing differences are within a specific value, it is preferable to receive UL signals of child links having a difference in UL Rx timing greater than a specific value through different time resources.

(1) Semi-Static UL Channel/Signal

Configuration for semi-static UL transmission of each MT is configured through RRC. For example, SR, SRS, and PRACH transmission resources of the MT are set to the MT through RRC. In this case, when it is configured to transmit these UL channels/signals through the same time resource for child MTs having different UL Rx timings, the DU may not successfully receive this UL channel/signal. Therefore, transmission resources of semi-static UL channels/signals need to be separated between these child MTs. At this time, the subject (e.g., CU, donor node) that determines/generates the RRC configuration cannot determine whether the transmission resource of the UL channel/signal should be separated between which child MTs. Therefore, the DU needs to inform the CU/parent DU of UL Rx timing related information of its own child MT. To this end, it is proposed that the DU inform the CU/parent DU of the following information. The following information can be informed only about the child MT except for the access UE connected to the DU. In the following, the term child MT may be interpreted as being replaced with a child link.

a) Alt 1. A difference between the UL Rx timing of each child MT compared to the reference timing may be informed. In this case, it is assumed that the UL Rx timing is always located later than the reference timing, so the difference value may always be a positive number. Alternatively, the UL Rx timing may be located before or after the reference timing, so that the difference value may be positive or negative. In this case, the reference timing may be as follows.

DL Tx timing of DU
 UL Rx timing for a specific child link of a DU
 UL Rx timing based on DU's access link (child link with UE) or child link with legacy MT b) Alt 2. This may inform the group index of each child MT. The DU may group the child MTs so that the child MTs having the same (similar) UL Rx timing belong to the same group. Therefore, in order to prevent RRC configuration from being given so that MTs belonging to different groups transmit UL channels/signals at the same time, the DU may inform the CU/parent DU of the group index of the child MT.

(2) Child Link Group Management

The DU may group the child MTs so that child MTs having different UL Rx timings (the difference is greater than or equal to a certain value) transmit UL channels/signals using different time resources. At this time, from the viewpoint of a specific child MT, a time resource capable of UL transmission and a time resource of which UL transmission cannot be performed exist. In a time resource in which the DU receives a UL from a child MT having a different UL Rx timing, the child MT may not perform UL transmission. In this case, the grouping of the child MT and the UL channel/signal transmission time may be determined and applied by the DU implicitly through scheduling. On the other hand, inevitably, two UL channels/signals having different UL Rx timings are transmitted at the same time, by applying a UL Rx timing different from the UL Rx timing applied by the DU for UL reception at a specific time point, a child MT may transmit a UL channel/signal. In order to prevent such a problem, the following information may be provided by the DU (or the donor node/CU) to the child MT.

Alt 1. The child MT can receive time resource information that it can perform UL transmission. The child MT performs UL transmission only on the corresponding resource, and does not perform UL transmission when UL transmission is scheduled on a resource other than the corresponding resource. Alternatively, the child MT may receive time resource information that it cannot perform UL transmission. The child MT does not perform UL transmission when UL transmission is scheduled in a time resource in which UL transmission cannot be performed.

(3) Setting of Target UL Rx Timing for Each Child Link Group

The DU groups the child MTs to receive UL channels/signals of child links whose UL Rx timings match each other or whose timing differences are within a specific value through the same time resource, child MTs with different UL Rx timings (the difference is greater than or equal to a certain value) may transmit UL channels/signals with different time resources. In this case, the actual UL Rx timing may be different between the child MTs that want to receive the UL channel/signal at the same time. For example, a plurality of child MTs may apply timing alignment case 6 to perform MT UL transmission according to their DU DL Tx timing. At this time, from the DU perspective, the UL channels/signals of each child MT arrive at similar timings, but a certain error may occur. In this case, in order to reduce such an error, the DU may set a specific target UL Rx timing and may adjust the TA_6 value of each child MT so that the UL channel/signal arrives at the corresponding timing. In this case, when the child MT applies timing alignment case 6, the DU DL Tx timing does not match its UL Tx timing, it can match the UL Tx timing by applying the TA_6 value set from the DU. Specifically, using the TA_6 value, the child MT may apply its UL Tx timing as follows. This UL Tx timing adjustment method may be limited when the corresponding child MT applies the timing alignment case 6.

Alt 1. When the legacy UE/MT sets its UL Tx timing as DL Rx timing−(TA+TA_offset), the UL Tx timing of the child MT may be equal to DL Rx timing−(TA_6+TA_offset). In this case, TA_6 may be a value independent of TA.
 Alt 2. When the legacy UE/MT sets its UL Tx timing as DL Rx timing−(TA+TA_offset), the UL Tx timing of the child MT may be equal to DL Rx timing−(TA+TA_6+TA_offset). In this case, characteristically, the value of TA_6 may be limited to a negative number. In this case, TA_6 may be a value set/managed independently of TA.

(4) Child-MT Behavior

The IAB node may use a DU/MT Tx/Rx timing alignment scheme different from that of the legacy IAB node. Whereas legacy IAB nodes performed timing alignment using the timing alignment case 1 method, the improved IAB node may perform timing alignment using timing alignment cases 6 or 7.

In order for the IAB node to apply the timing alignment case 6 or 7, it is set to apply the timing alignment case from the parent DU/CU, if necessary, additional information for applying the corresponding timing alignment case may need to be set. In this case, when the IAB node determines that the initial access to the parent DU or RRC setting is invalid, it may be necessary to assume the default timing alignment case and operate. This default timing alignment case may be the same as timing alignment case 1. In this case, the UL Tx timing at which the MT performs UL transmission to the parent DU may be applied differently depending on circumstances.

From the viewpoint of the parent DU, all child links of the corresponding DU may not have the same UL Rx timing. The IAB node DU may receive uplink signals transmitted by child links having the same/similar UL Rx timing through the same time resource. When the UL Rx timings between uplink signals transmitted by different child links are significantly different, all uplink signals may not be successfully received. Therefore, the DU simultaneously receives UL signals of child links whose UL Rx timings coincide with each other or whose timing differences are within a specific value, it is preferable to receive UL signals of child links having a difference in UL Rx timing greater than a specific value through different time resources.

In this case, the DU groups the child MTs to receive UL channels/signals of child links whose UL Rx timings match each other or whose timing differences are within a specific value through the same time resource, child MTs having different UL Rx timings (the difference is greater than or equal to a certain value) may transmit UL channels/signals with different time resources. That is, there are a plurality of UL Rx timings from the viewpoint of a specific parent DU, in a specific time resource, a specific UL Rx timing may be applied.

For example, DU receives UL by applying UL Rx timing 1 in time resource group 1, in time resource group 2, UL may be received by applying UL Rx timing 2. In this case, when the child MT transmits a UL signal to the DU by applying a specific UL Tx timing, UL transmission should be performed only within a specific time resource group. If the child MT wants to transmit UL through another time resource group, UL transmission should be performed according to the UL Rx timing applied by the DU in the corresponding time resource group. In this case, the MT may perform UL transmission by applying different UL Tx timings according to time resources.

Hereinafter, for a better understanding of the examples of the present specification, the disclosure of the present specification will be described with reference to the drawings. The following drawings were created to explain a specific example of the present specification. Since the names of specific devices described in the drawings or the names of specific signals/messages/fields are presented by way of example, the technical features of the present specification are not limited to the specific names used in the following drawings.

The following embodiments may operate together with the embodiments of the present specification described above (as long as the configurations are not contradictory to each other). In addition, the embodiments described below may operate independently of the embodiments of the present specification described above.

Figure 20:
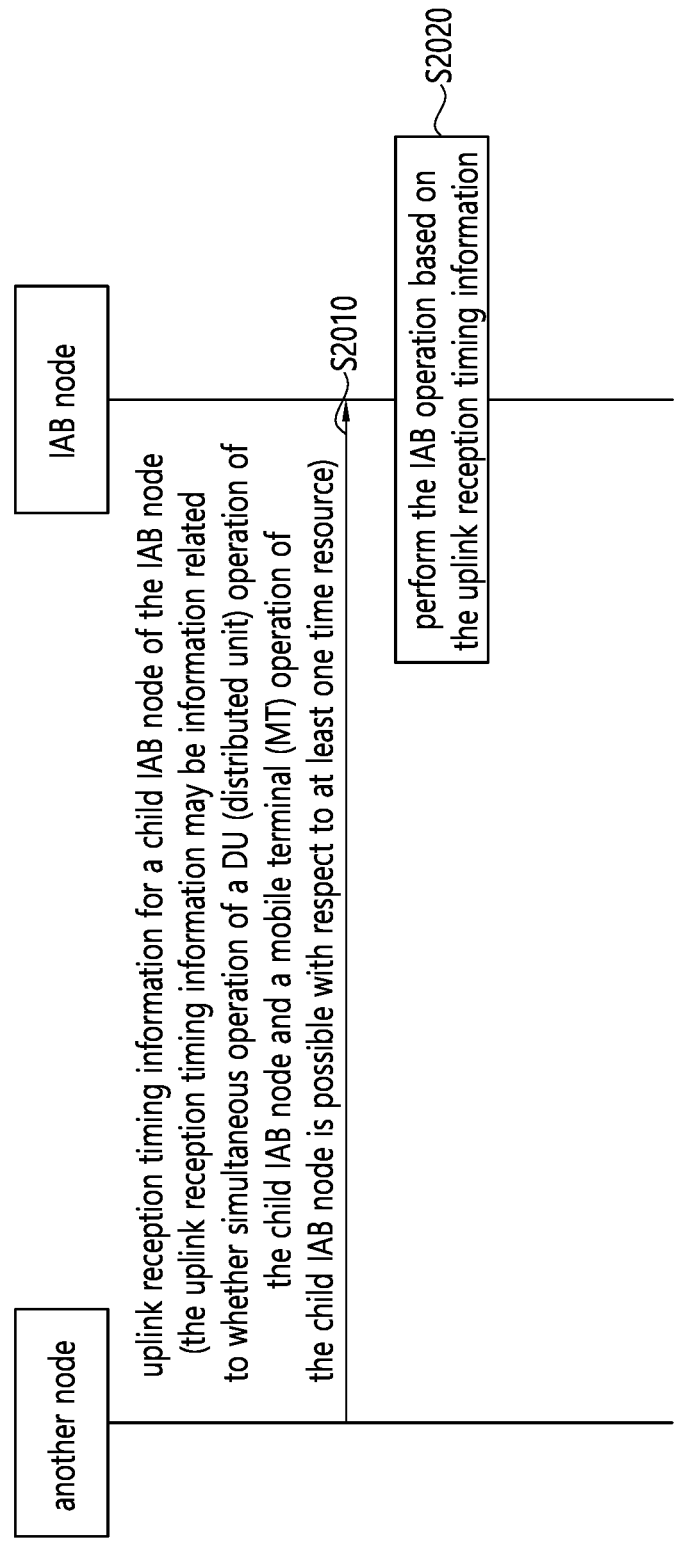
FIG. 20 is a flowchart of a method for receiving uplink reception timing information according to an embodiment of the present specification.

FIG. 20 is a flowchart of a method for receiving uplink reception timing information according to an embodiment of the present specification.

According to FIG. 20, an IAB node may receive uplink reception timing information for a child IAB node of the IAB node from another node (S2010). Since a more specific embodiment is the same as described above (and will be described later), repeated description of overlapping content will be omitted for convenience of description.

Here, the uplink reception timing information may be information related to whether simultaneous operation of a DU (distributed unit) operation of the child IAB node and a mobile terminal (MT) operation of the child IAB node is possible with respect to at least one time resource. Since a more specific embodiment is the same as described above (and will be described later), repeated description of overlapping content will be omitted for convenience of description.

The IAB node may perform the IAB operation based on the uplink reception timing information (S2020). Since a more specific embodiment is the same as described above (and will be described later), repeated description of overlapping content will be omitted for convenience of description For example, the MT operation of the child IAB node is an operation related to communication between the IAB node and the child IAB node, the DU operation of the child IAB node is an operation related to communication between the child IAB node and the grandchild IAB node or communication between the child IAB node and the terminal, and the grandchild IAB node may be a child IAB node of the child IAB node. Since a more specific embodiment is the same as described above (and will be described later), repeated description of overlapping content will be omitted for convenience of description.

For example, the other node may be a donor node, a centralized unit (CU), or a network. Since a more specific embodiment is the same as described above (and will be described later), repeated description of overlapping content will be omitted for convenience of description.

For example, the child IAB node may be an IAB node that applies different uplink reception timing according to each time resource among a plurality of time resources. Here, for example, the at least one time resource may be included in the plurality of time resources. Since a more specific embodiment is the same as described above (and will be described later), repeated description of overlapping content will be omitted for convenience of description.

For example, the uplink reception timing information may be transmitted by the IAB node to the child IAB node. Since a more specific embodiment is the same as described above (and will be described later), repeated description of overlapping content will be omitted for convenience of description.

For example, the uplink reception timing information may be transmitted to the child IAB node by the other node. Since a more specific embodiment is the same as described above (and will be described later), repeated description of overlapping content will be omitted for convenience of description.

For example, the uplink reception timing information may be transmitted through F1-AP (Application Protocol) signaling. Since a more specific embodiment is the same as described above (and will be described later), repeated description of overlapping content will be omitted for convenience of description.

For example, the uplink reception timing information may be information on the at least one time resource to which the child IAB node or the DU of the child IAB node applies or does not apply the uplink reception timing according to timing alignment case #7. Since a more specific embodiment is the same as described above (and will be described later), repeated description of overlapping content will be omitted for convenience of description.

For example, the uplink reception timing information may be offset information from a reference uplink reception timing. Since a more specific embodiment is the same as described above (and will be described later), repeated description of overlapping content will be omitted for convenience of description.

Hereinafter, specific examples of the present specification will be described in more detail.

Considering the situation in which the IAB-DU can operate with only one Rx timing at the same time, the IAB-DU may perform UL Rx to child link(s) having different Rx timings by applying different Rx timings according to time. That is, the IAB-DU may receive a UL signal from the child MT/UE by applying different UL Rx timings according to time resources. As an example, the IAB-DU may perform UL reception to the child link(s) to which the Rx timing is applied by applying the first Rx timing in the first time domain, in the second time domain, UL reception to the child link(s) to which the Rx timing is applied may be performed by applying the second Rx timing.

The IAB-DU may itself determine/decide the UL Rx timing according to the time resource.

Alternatively, the IAB-DU may receive information on UL Rx timing according to the time support as described above from a donor-node/CU/network, etc. through F1-AP signaling. Or, this information is received by the IAB-MT existing in the same IAB-node as the IAB-DU through MAC CE/DCI signaling from the parent-DU, the IAB-DU may receive this information from the IAB-MT. More specifically, 'information on UL Rx timing according to time resources' may mean the following.

- Alt 1. Timing alignment case information applied by the IAB-node or the IAB-DU according to the time resource.
- Alt 2. Time resource information to which the IAB-node or IAB-DU applies or does not apply UL Rx timing according to timing alignment case #7. This may be replaced with time resource information in which the IAB-node can perform simultaneous reception between the MT and the DU, or time resource information in which it cannot perform.
- Alt 3. Information on UL Rx timing applied by an IAB-node or an IAB-DU according to a time resource. For example, this information may be offset/difference information from the reference UL Rx timing.

The information on the UL Rx timing of the IAB-DU as described above needs to be known by the parent-DU. Simultaneous operation of the IAB-MT and the IAB-DU may vary depending on whether the timing between the IAB-MT and the IAB-DU is aligned. Therefore, when the UL Rx timing applied by the IAB-DU varies depending on the time resource, the possibility of simultaneous operation of the IAB-MT and the IAB-DU may vary depending on the time resource. That is, whether transmission/reception is possible between the parent-DU and the IAB-MT in a specific time domain may vary depending on the Rx timing applied by the IAB-DU. In this case, the parent-DU needs to know information about the Rx timing applied by the IAB-DU to determine whether transmission/reception with the IAB-MT is possible.

To this end, in the present specification, it is proposed that the parent-DU share/receive information on the UL Rx timing of the IAB-DU. To this end, the following methods are specifically proposed.

Method 1. 'information on UL Rx timing according to time resource' of the IAB-DU may be delivered/configured through signaling such as F1-AP from a donor-node/CU/network, etc. to the parent-DU of the IAB-DU. Expressing this differently, 'information on UL Rx timing according to time resource' applied by its child-node (child-DU) may be delivered/set through signaling such as F1-AP from donor-node/CU/network, etc. to the IAB-DU. Characteristically, this method can be applied together when the IAB-DU receives information on UL Rx timing according to time support from a donor-node/CU/network, etc.

Method 2. 'Information on UL Rx timing according to time resource' of the IAB-DU may be transmitted/reported from the IAB-node to the parent-DU of the IAB-DU. This may be transmitted from IAB-DU through F1-AP signaling, or from IAB-MT through MAC signaling. In other words, the IAB-DU may receive 'information on UL Rx timing according to time resource' applied by the child-DU from its child-node. Characteristically, this method can be applied together when the IAB-DU decides/determines information on UL Rx timing according to time support.

At this time, the 'information on the UL Rx timing according to the time resource' described above and described in the claims may mean the following.

- Alt 1. Timing alignment case information applied by the IAB-node or the IAB-DU according to the time resource; and/or
- Alt 2. Time resource information to which the IAB-node or IAB-DU applies or does not apply UL Rx timing according to timing alignment case #7. This may be replaced with time resource information in which the IAB-node can perform simultaneous reception between the MT and the DU or time resource information in which it cannot; and/or
- Alt 3. Information on UL Rx timing applied by the IAB-node or IAB-DU according to time resources. For example, this information may be offset/difference information from the reference UL Rx timing; and/or
- Alt 4. Information on whether simultaneous operation of IAB-DU and IAB-MT according to time resource is possible or (impossible) time resource in which simultaneous operation is possible; and/or
- Alt 5. Information on whether the operation of the IAB-MT is possible according to the time resource or the (impossible) time resource in which the operation of the IAB-MT is possible.

When the IAB-DU does not apply the UL Rx timing according to the timing alignment case #7, and performs UL Rx with a different timing, IAB-DU and IAB-MT cannot perform simultaneous operation Rx/Rx. In this specification, IAB-Node applies Case 7 timing mode to the resource where MT and DU perform simultaneous Tx/Tx, when simultaneous operation is impossible due to timing misalignment between MT and DU due to IAB-DU applying different Rx timing, it is suggested to operate as follows.

- Alt a. In the IAB-node, MT or DU operates in TDM according to availability indication information in DU H/S/NA resource type and Soft resource in time (time) resource. A specific operation may be as follows.

With reference to the slot of the IAB-DU serving cell, the symbols in the slot of the IAB-DU serving cell may be configured as hard, soft, or unavailable types. If the downlink, uplink, or flexible symbol is configured as hard, the IAB-DU serving cell may transmit, receive, or both transmit or receive in the symbol, respectively.

If the downlink, uplink, or flexible symbol is configured as soft, the IAB-DU can transmit, receive, or both transmit or receive, respectively, in the symbol only in the following cases.

- the IAB-MT does not transmit or receive in the symbol, or
- When the IAB-MT transmits/receives in a symbol and the transmission/reception of the symbol is not changed due to the use of the symbol of the IAB-DU, or
- When the IAB-MT detects DCI format 2_5 using the AI index field value indicating that soft symbols are available.

If the symbol is configured as unavailable, then the IAB-DU will not transmit or receive on the symbol.

i) When the IAB-DU transmits periodic CSI-RS in the symbol of the SS/PBCH block, the PDCCH for the Type0-PDCCH CSS set configured by pdcchConfigSIB1, or the slot, or ii) when the IAB-DU receives the PRACH or SR in the symbol of the slot, the symbol of the slot is the same as that which is composed of hard. In addition, the IAB-DU may operate in the same way that the symbol of the corresponding slot is configured as hard.

Alt b. The IAB-node performs a DU operation on the corresponding resource. For ULs that need to be received using different Rx timings, since reception is possible only from the corresponding resource, it is to give priority to the reception of the corresponding UL.

The contents of the above specification may be applied even when the UL Rx timing of the IAB-DU is maintained statically/semi-statically without changing according to time resources.

As described above, the DU of the existing IAB node operated with one UL Rx timing.

A Case 6 timing mode is defined in the IAB-node to support the simultaneous transmission between MTs of the DU of the Rel-17 IAB node. When the child-MT performs UL Tx by applying this Case 6 timing mode, the DU must perform reception using a UL Rx timing different from its original UL Rx timing. That is, unlike the conventional one, the DU needs to operate with a plurality of UL Rx timings.

In addition, whether the parent-node of the IAB node can transmit/receive with the MT may vary according to the Rx timing of the DU.

Therefore, if the Rx timing information according to the time of the DU is not known, there may be a problem in determining whether operation with the MT is possible.

According to the embodiment of the present specification, it is possible for the DU to perform a plurality of Rx timings to perform UL Rx for an existing terminal and, for example, an MT that does not operate as a Case 6 timing node. In addition, it may be possible for the parent-DU to obtain Rx timing information for the IAB DU to determine the resource available for transmission/reception with the MT.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

Figure 21:
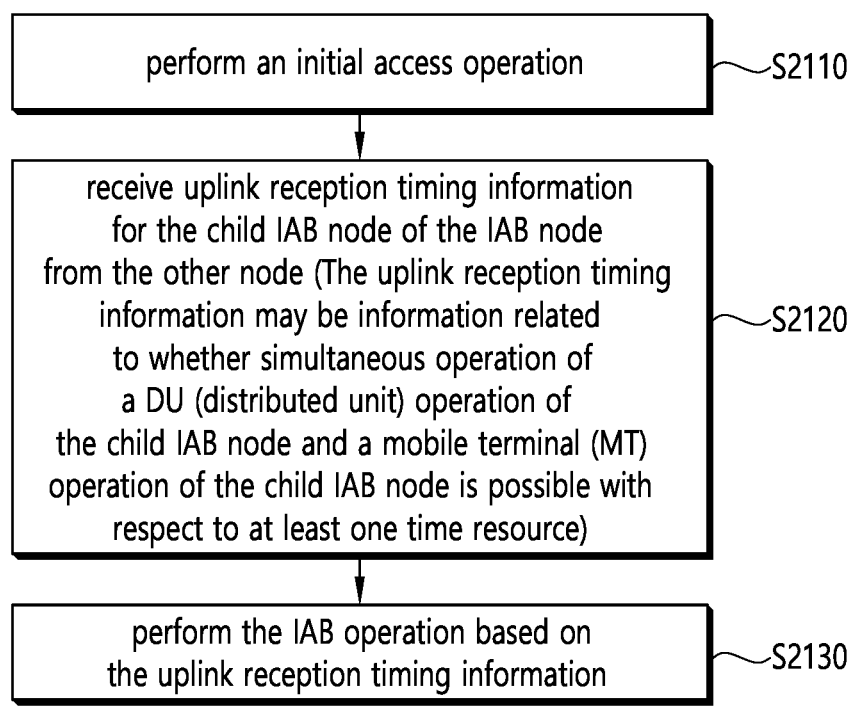
FIG. 21 is a flowchart of a method for receiving uplink reception timing information according to another embodiment of the present specification.

FIG. 21 is a flowchart of a method for receiving uplink reception timing information according to another embodiment of the present specification.

According to FIG. 21, the IAB node may perform an initial access operation with another node (S2110). Since a more specific embodiment is the same as described above (and will be described later), repeated description of overlapping content will be omitted for convenience of description.

The IAB node may receive uplink reception timing information for the child IAB node of the IAB node from the other node (S2120). Since a more specific embodiment is the same as described above (and will be described later), repeated description of overlapping content will be omitted for convenience of description.

The IAB node may perform the IAB operation based on the uplink reception timing information (S2130). Since a more specific embodiment is the same as described above (and will be described later), repeated description of overlapping content will be omitted for convenience of description.

The uplink reception timing information may be information related to whether simultaneous operation of a DU (distributed unit) operation of the child IAB node and a mobile terminal (MT) operation of the child IAB node is possible with respect to at least one time resource. Since a more specific embodiment is the same as described above (and will be described later), repeated description of overlapping content will be omitted for convenience of description.

Meanwhile, the contents to which the above-described examples are applied may be described from the viewpoint of various subjects as follows.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 22:
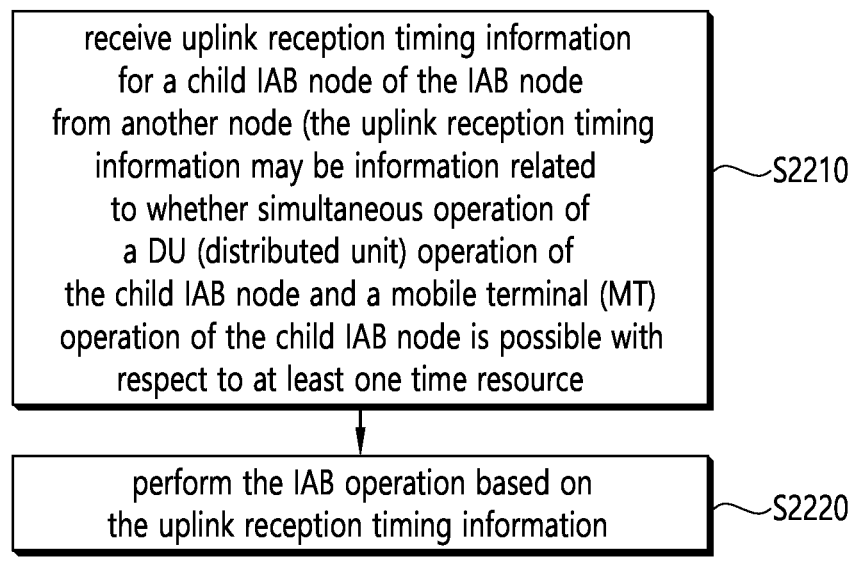
FIG. 22 is a flowchart of a method for receiving uplink reception timing information (from an IAB node perspective) according to an embodiment of the present specification.

FIG. 22 is a flowchart of a method for receiving uplink reception timing information (from an IAB node perspective) according to an embodiment of the present specification.

According to FIG. 22, the IAB node may receive uplink reception timing information for a child IAB node of the IAB node from another node (S2210). Since a more specific embodiment is the same as described above (and will be described later), repeated description of overlapping content will be omitted for convenience of description.

The IAB node may perform the IAB operation based on the uplink reception timing information (S2220). Since a more specific embodiment is the same as described above (and will be described later), repeated description of overlapping content will be omitted for convenience of description.

Here, the uplink reception timing information may be information related to whether simultaneous operation of a DU (distributed unit) operation of the child IAB node and a mobile terminal (MT) operation of the child IAB node is possible with respect to at least one time resource. Since a more specific embodiment is the same as described above (and will be described later), repeated description of overlapping content will be omitted for convenience of description.

Figure 23:
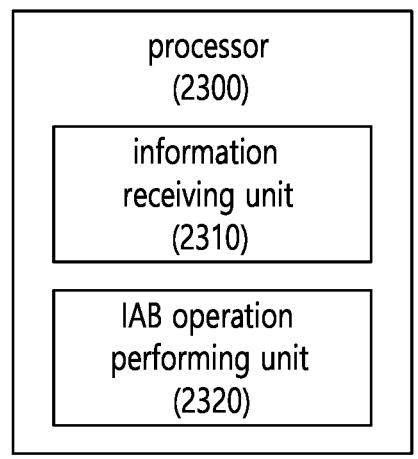
FIG. 23 is a block diagram of an example of an apparatus for receiving uplink reception timing information (from an IAB node perspective) according to an embodiment of the present specification.

FIG. 23 is a block diagram of an example of an apparatus for receiving uplink reception timing information (from an IAB node perspective) according to an embodiment of the present specification.

Referring to FIG. 23, the processor 2300 may include an information receiving unit 2310 and an IAB operation performing unit 2320. Here, the processor 2300 may correspond to a processor in FIGS. 26 to 32 to be described later.

The information receiving unit 2310 may be configured to control the transceiver to receive uplink reception timing information for a child IAB node of the IAB node from another node. Since a more specific embodiment is the same as described above (and will be described later), repeated description of overlapping content will be omitted for convenience of description.

The IAB operation performing unit 2320 may be configured to perform an IAB operation based on the uplink reception timing information. Since a more specific embodiment is the same as described above (and will be described later), repeated description of overlapping content will be omitted for convenience of description.

Here, the uplink reception timing information may be information related to whether simultaneous operation of a DU (distributed unit) operation of the child IAB node and a mobile terminal (MT) operation of the child IAB node is possible with respect to at least one time resource. Since a more specific embodiment is the same as described above (and will be described later), repeated description of overlapping content will be omitted for convenience of description.

Meanwhile, although not shown separately, the present specification may also provide the following embodiments.

According to an embodiment, an Integrated Access and Backhaul (IAB) node may be a node comprising a transceiver, at least one memory and at least one processor operatively coupled with the at least one memory and the transceiver, the at least one processor configured to perform an initial access operation with another node, control the transceiver to receive, from the another node, uplink reception timing information for a child IAB node of the IAB node and perform an IAB operation based on the uplink reception timing information, where the uplink reception timing information is information related to whether simultaneous operation of a distributed unit (DU) operation of the child IAB node and a mobile terminal (MT) operation of the child IAB node is possible for at least one time resource. Since a more specific embodiment is the same as described above (and will be described later), repeated description of overlapping content will be omitted for convenience of description.

According to an embodiment, an apparatus may be an apparatus comprising at least one memory and at least one processor operatively coupled with the at least one memory, the at least one processor configured to perform an initial access operation with another node, control a transceiver to receive, from the another node, uplink reception timing information for a child Integrated Access and Backhaul (IAB) node of an IAB node and perform an IAB operation based on the uplink reception timing information, where the uplink reception timing information is information related to whether simultaneous operation of a distributed unit (DU) operation of the child IAB node and a mobile terminal (MT) operation of the child IAB node is possible for at least one time resource. Since a more specific embodiment is the same as described above (and will be described later), repeated description of overlapping content will be omitted for convenience of description.

According to an embodiment, a CRM may be at least one computer readable medium including instructions based on being executed by at least one processor, the at least one processor configured to perform an initial access operation with another node, control a transceiver to receive, from the another node, uplink reception timing information for a child Integrated Access and Backhaul (IAB) node of an IAB node and perform an IAB operation based on the uplink reception timing information, where the uplink reception timing information is information related to whether simultaneous operation of a distributed unit (DU) operation of the child IAB node and a mobile terminal (MT) operation of the child IAB node is possible for at least one time resource. Since a more specific embodiment is the same as described above (and will be described later), repeated description of overlapping content will be omitted for convenience of description.

FIG. 24 is a flowchart of a method for transmitting uplink reception timing information (from the point of view of a parent node).

According to FIG. 24, the node may transmit the uplink reception timing information for the child IAB node of the IAB node to the IAB node (S2410). Since a more specific embodiment is the same as described above (and will be described later), repeated description of overlapping content will be omitted for convenience of description.

Here, the uplink reception timing information may be information related to whether simultaneous operation of a DU (distributed unit) operation of the child IAB node and a mobile terminal (MT) operation of the child IAB node is possible with respect to at least one time resource. Since a more specific embodiment is the same as described above (and will be described later), repeated description of overlapping content will be omitted for convenience of description.

Figure 25:
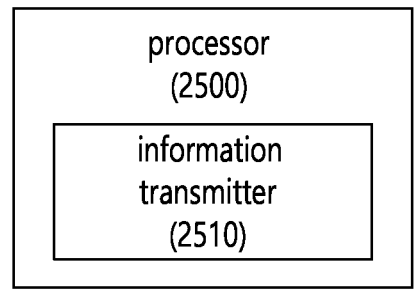
FIG. 25 is a block diagram of an example of an apparatus for transmitting uplink reception timing information (from the point of view of a parent node).

FIG. 25 is a block diagram of an example of an apparatus for transmitting uplink reception timing information (from the point of view of a parent node).

Referring to FIG. 25, the processor 2500 may include an information transmitter 2510. Here, the processor 2500 may correspond to a processor in FIGS. 26 to 32 to be described later.

The information transmitter 2510 may be configured to control the transceiver to transmit uplink reception timing information for the child IAB node of the IAB node to the IAB node. Since a more specific embodiment is the same as described above (and will be described later), repeated description of overlapping content will be omitted for convenience of description.

Here, the uplink reception timing information may be information related to whether simultaneous operation of a DU (distributed unit) operation of the child IAB node and a mobile terminal (MT) operation of the child IAB node is possible with respect to at least one time resource. Since a more specific embodiment is the same as described above (and will be described later), repeated description of overlapping content will be omitted for convenience of description.

Figure 26:
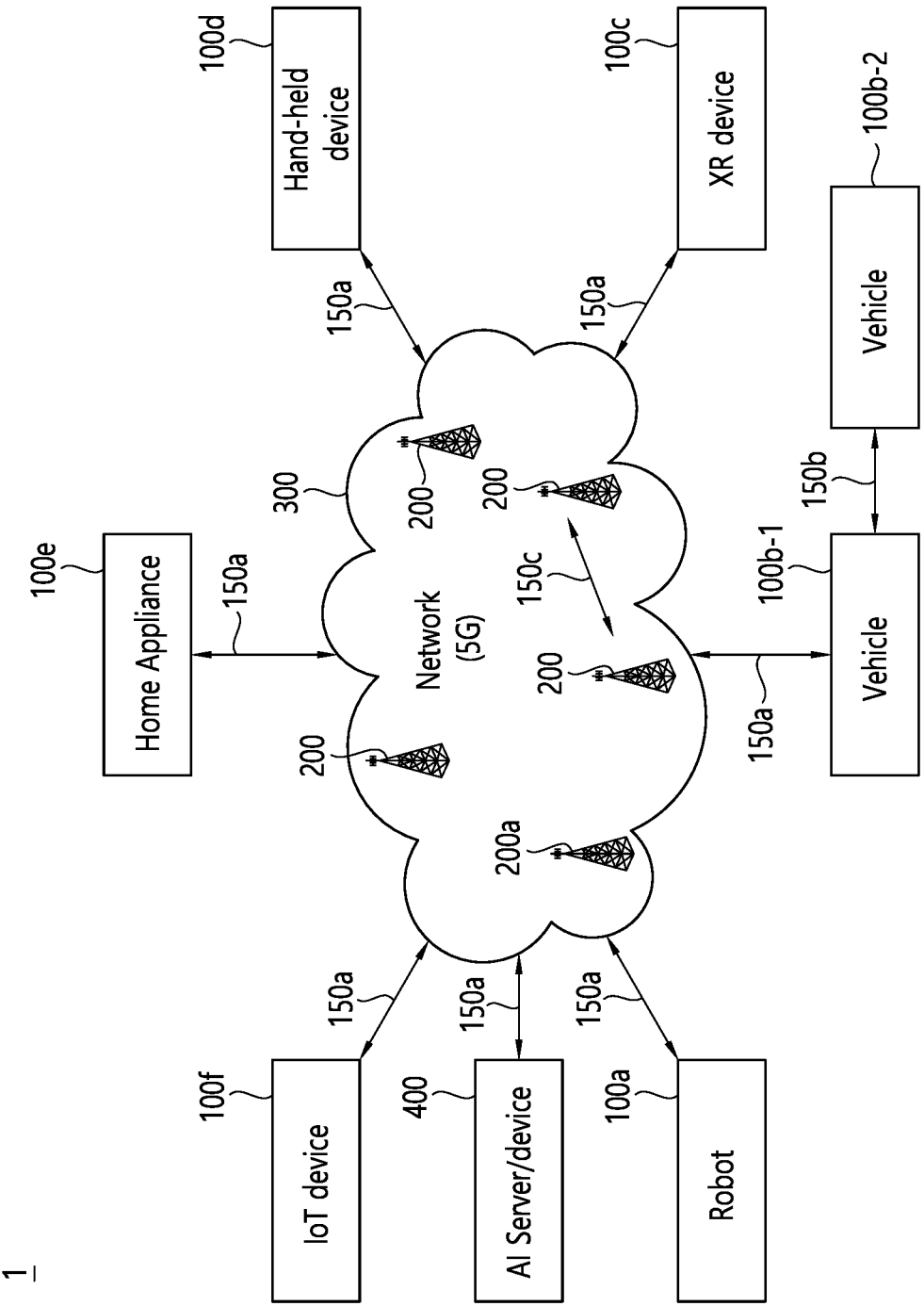
FIG. 26 shows an exemplary communication system (1), according to an embodiment of the present specification.

FIG. 26 shows an exemplary communication system (1), according to an embodiment of the present specification.

Referring to FIG. 26, a communication system (1) to which various embodiments of the present specification are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a-100f) may be connected to the network (300) via the BSs (200). An Artificial Intelligence (AI) technology may be applied to the wireless devices (100a-100f) and the wireless devices (100a-100f) may be connected to the AI server (400) via the network (300). The network (300) may be configured using a 3G network, a 4G (e.g., LTE) network, or a 5G (e.g., NR) network. Although the wireless devices (100a-100f) may communicate with each other through the BSs (200)/network (300), the wireless devices (100a-100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a-100f).

Wireless communication/connections (150a, 150b, 150c) may be established between the wireless devices (100a-100f)/BS (200), or BS (200)/BS (200). Herein, the wireless communication/connections may be established through various RATs (e.g., 5G NR) such as uplink/downlink communication (150a), sidelink communication (150b) (or D2D communication), or inter BS communication (150c) (e.g., relay, Integrated Access Backhaul (IAB)). The wireless devices and the BSs/the wireless devices may transmit/receive radio signals to/from each other through the wireless communication/connections (150a, 150b, 150c). For example, the wireless communication/connections (150a, 150b, 150c) may transmit/receive signals through various physical channels. For this, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present specification.

Meanwhile, in NR, multiple numerologies (or subcarrier spacing (SCS)) for supporting various 5G services may be supported. For example, in case an SCS is 15 kHz, a wide area of the conventional cellular bands may be supported, and, in case an SCS is 30 kHz/60 kHz dense-urban, lower latency, and wider carrier bandwidth may be supported. In case the SCS is 60 kHz or higher, a bandwidth that is greater than 24.25 GHz may be used in order to overcome phase noise.

An NR frequency band may be defined as two different types of frequency ranges (FR1, FR2). The values of the frequency ranges may be changed (or varied), and, for example, the two different types of frequency ranges (FR1, FR2) may be as shown below in Table 4. Among the frequency ranges that are used in an NR system, FR1 may mean a "sub 6 GHz range", and FR2 may mean an "above 6 GHz range" and may also be referred to as a millimeter wave (mmW).

TABLE 4

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 5, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., automated driving).

TABLE 5

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Hereinafter, an example of wireless devices to which the present specification is applied will be described in detail.

Figure 27:
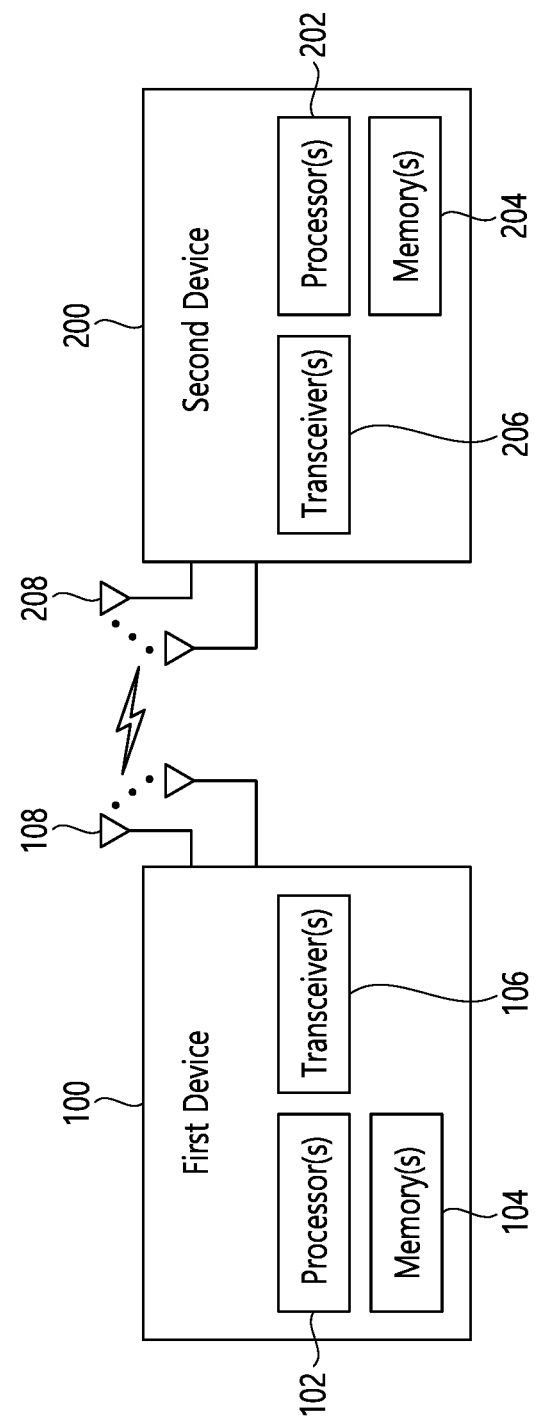
FIG. 27 shows an exemplary wireless device to which the present specification can be applied.

FIG. 27 shows an exemplary wireless device to which the present specification can be applied.

Referring to FIG. 27, a first wireless device (100) and a second wireless device (200) may transmit radio signals through a variety of RATs (e.g., LTE, NR). Herein, {the first wireless device (100) and the second wireless device (200)} may correspond to {the wireless device (100x) and the BS (200)} and/or {the wireless device (100x) and the wireless device (100x)} of FIG. 26.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including instructions for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present specification, the wireless device may represent a communication modem/circuit/chip.

The second wireless device (200) may include one or more processors (202) and one or more memories (204) and additionally further include one or more transceivers (206)

and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store various information related to operations of the processor(s) (202). For example, the memory(s) (204) may store software code including instructions for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF transceiver(s). In the present specification, the wireless device may represent a communication modem/circuit/chip.

Hereinafter, hardware elements of the wireless devices (100, 200) will be described in more detail. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, instructions, and/or a set of instructions.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. For this, the one or more transceivers (106, 206) may include (analog) oscillators and/or filters.

Figure 28:
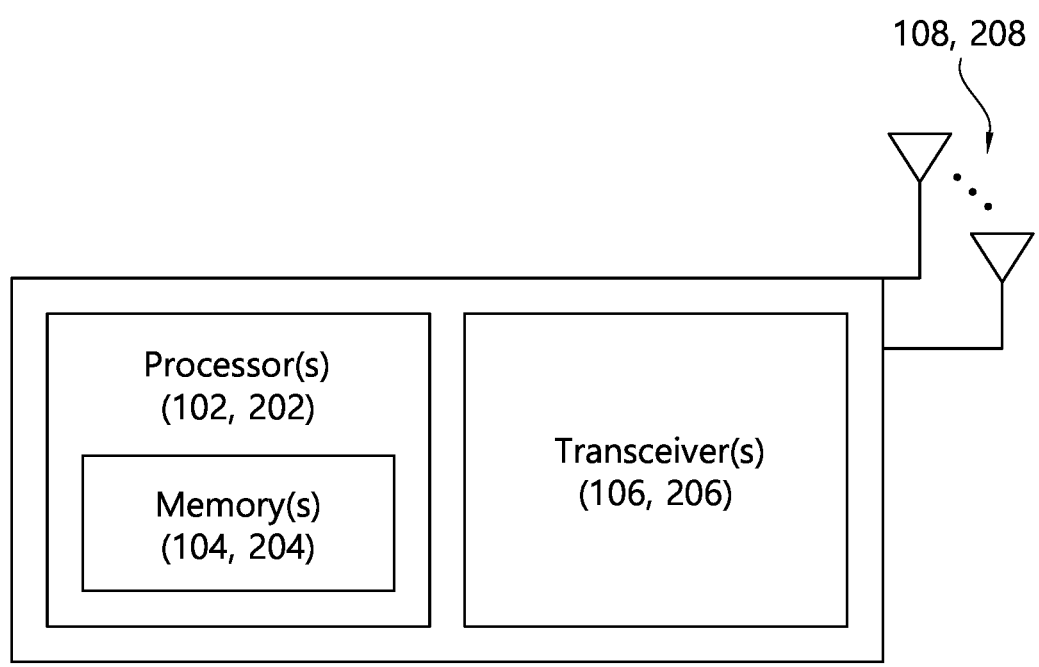
FIG. 28 shows another example of a wireless device applicable to the present specification.

FIG. 28 shows another example of a wireless device applicable to the present specification.

According to FIG. 28, the wireless device may include at least one processor (102, 202), at least one memory (104, 204), at least one transceiver (106, 206), and/or one or more antennas (108, 208).

As a difference between the example of the wireless device described above in FIG. 27 and the example of the wireless device in FIG. 28, in FIG. 27, the processors 102 and 202 and the memories 104 and 204 are separated, but in the example of FIG. 28, the memories 104 and 204 are included in the processors 102 and 202.

Here, a detailed description of the processors 102 and 202, the memories 104 and 204, the transceivers 106 and 206, and the one or more antennas 108 and 208 is as described above, in order to avoid unnecessary repetition of description, description of repeated description will be omitted.

Hereinafter, an example of a signal processing circuit to which the present specification is applied will be described in detail.

Figure 29:
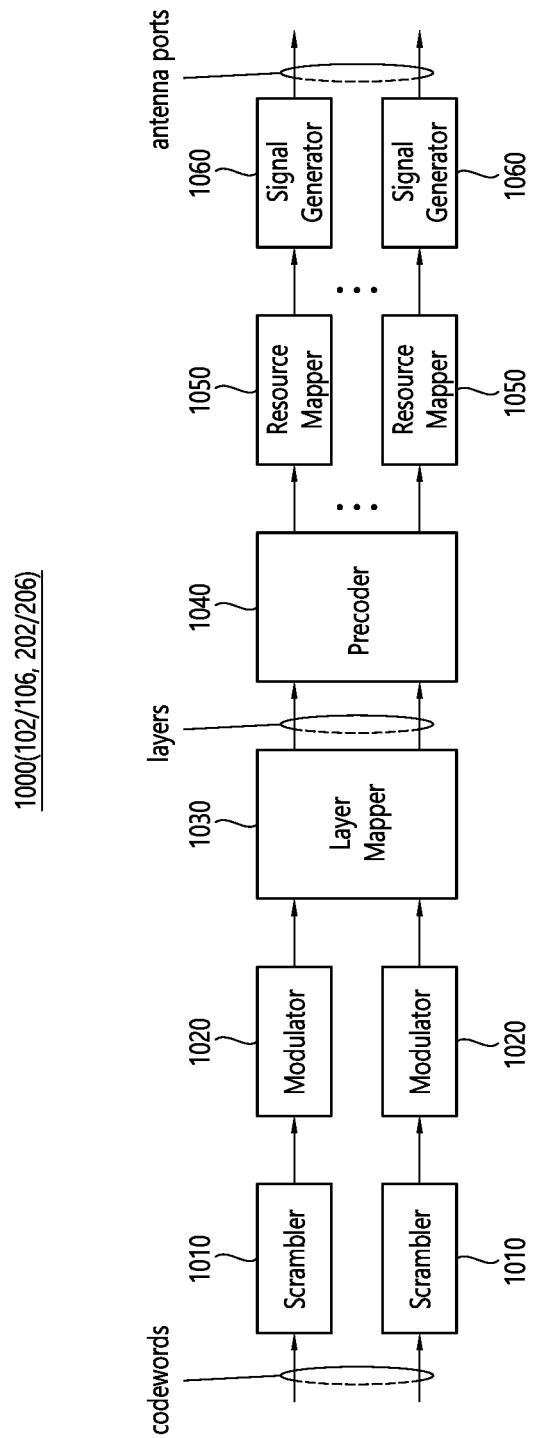
FIG. 29 shows a signal process circuit for a transmission signal according to an embodiment of the present specification.

FIG. 29 shows a signal process circuit for a transmission signal according to an embodiment of the present specification.

Referring to FIG. 29, a signal processing circuit (1000) may include scramblers (1010), modulators (1020), a layer mapper (1030), a precoder (1040), resource mappers (1050), and signal generators (1060). An operation/function of FIG. 29 may be performed, without being limited to, the processors (102, 202) and/or the transceivers (106, 206) of FIG. 27. Hardware elements of FIG. 29 may be implemented by the processors (102, 202) and/or the transceivers (106, 206) of FIG. 27. For example, blocks 1010-1060 may be implemented by the processors (102, 202) of FIG. 27. Alternatively, the blocks 1010-1050 may be implemented by the processors (102, 202) of FIG. 27 and the block 1060 may be implemented by the transceivers (106, 206) of FIG. 27.

Codewords may be converted into radio signals via the signal processing circuit (1000) of FIG. 29. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

More specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports, and M is the number of transport layers. The precoder (1040) may perform precoding after performing transform precoding (e.g., DFT) for complex modulation symbols. Additionally, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), frequency uplink converters, and so on.

Signal processing procedures for a signal received in the wireless device may be configured in a reverse manner of the signal processing procedures (1010-1060) of FIG. 29. For example, the wireless devices (e.g., 100, 200 of FIG. 27) may receive radio signals from the exterior through the antenna ports/transceivers. The received radio signals may be converted into baseband signals through signal restorers. For this, the signal restorers may include frequency downlink converters, Analog-to-Digital Converters (ADCs), CP remover, and Fast Fourier Transform (FFT) modules. Subsequently, the baseband signals may be restored to codewords through a resource demapping procedure, a postcoding procedure, a demodulation processor, and a descrambling procedure. The codewords may be restored to original information blocks through decoding. Therefore, a signal processing circuit (not shown) for a reception signal may include signal restorers, resource demappers, a postcoder, demodulators, descramblers, and decoders.

Hereinafter, a usage example of the wireless to which the present specification is applied will be described in detail.

Figure 30:
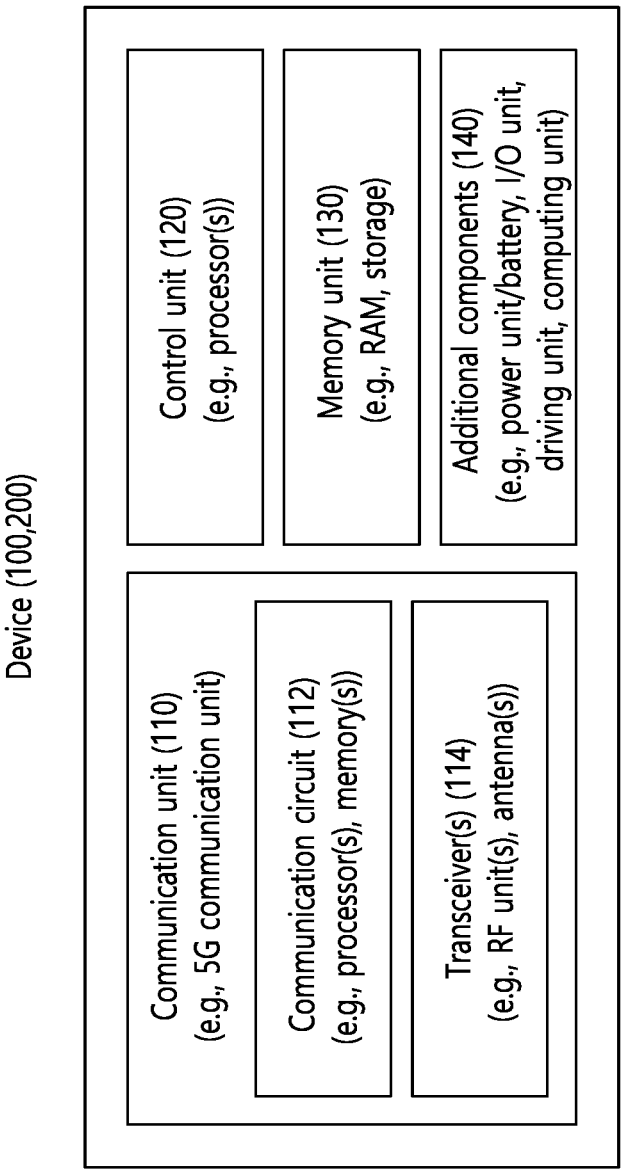
FIG. 30 shows another example of a wireless device according to an embodiment of the present specification.

FIG. 30 shows another example of a wireless device according to an embodiment of the present specification. The wireless device may be implemented in various forms according to a use-case/service (refer to FIG. 26).

Referring to FIG. 30, wireless devices (100, 200) may correspond to the wireless devices (100, 200) of FIG. 27 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 27. For example, the transceiver(s) (114) may include the one or more transceivers (106, 206) and/or the one or more antennas (108, 208) of FIG. 27. The control unit (120) is electrically connected to the communication unit (110), the memory (130), and the additional components (140) and controls overall operation of the wireless devices. For example, the control unit (120) may control an electric/mechanical operation of the wireless device based on programs/code/instructions/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 26), the vehicles (100b-1, 100b-2 of FIG. 26), the XR device (100c of FIG. 26), the hand-held device (100d of FIG. 26), the home appliance (100e of FIG. 26), the IoT device (100f of FIG. 26), a digital broadcast terminal, a hologram device, a public safety device, an MTC device, a medicine device, a fintech device (or a finance device), a security device, a climate/environment device, the AI server/device (400 of FIG. 26), the BSs (200 of FIG. 26), a network node, and so on. The wireless device may be used in a mobile or fixed place according to a usage-example/service.

In FIG. 30, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 30 will be described in detail with reference to the drawings.

Figure 31:
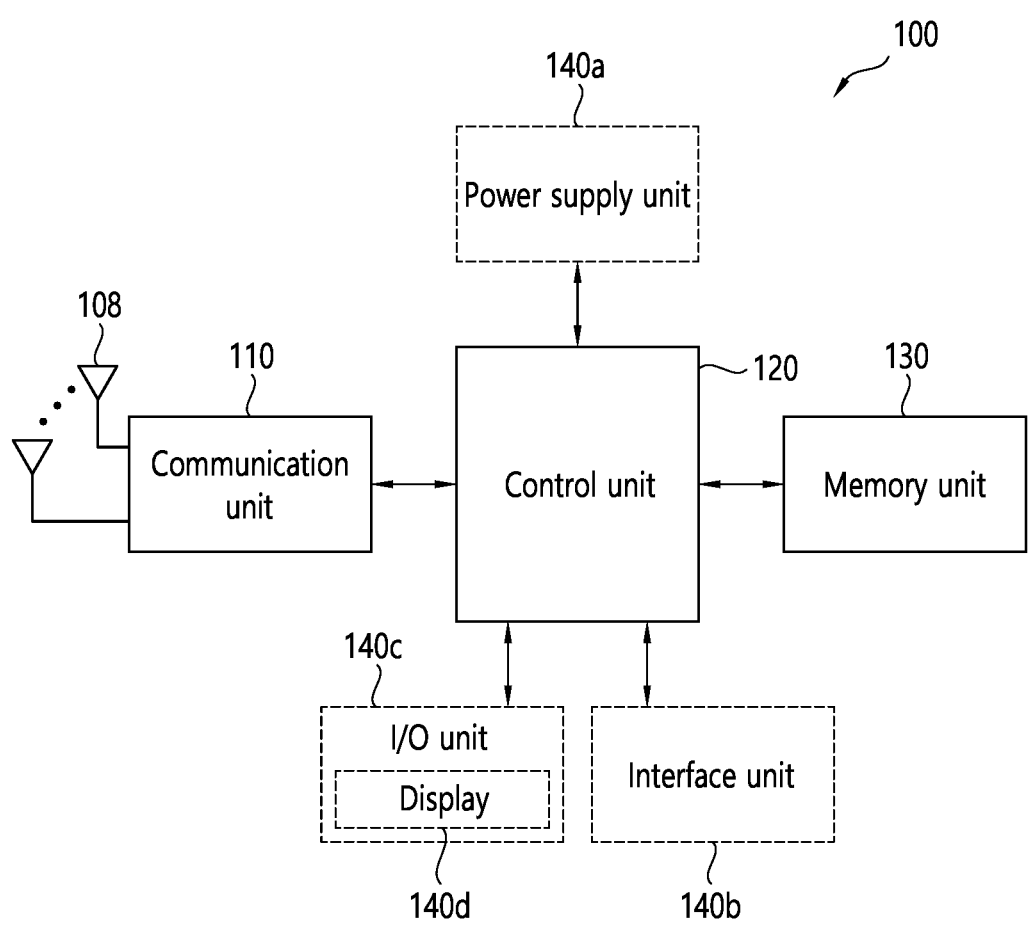
FIG. 31 shows a hand-held device to which the present specification is applied.

FIG. 31 shows a hand-held device to which the present specification is applied. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 31, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110-130/140a-140c correspond to the blocks 110-130/140 of FIG. 30, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/instructions (or commands) needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 32:
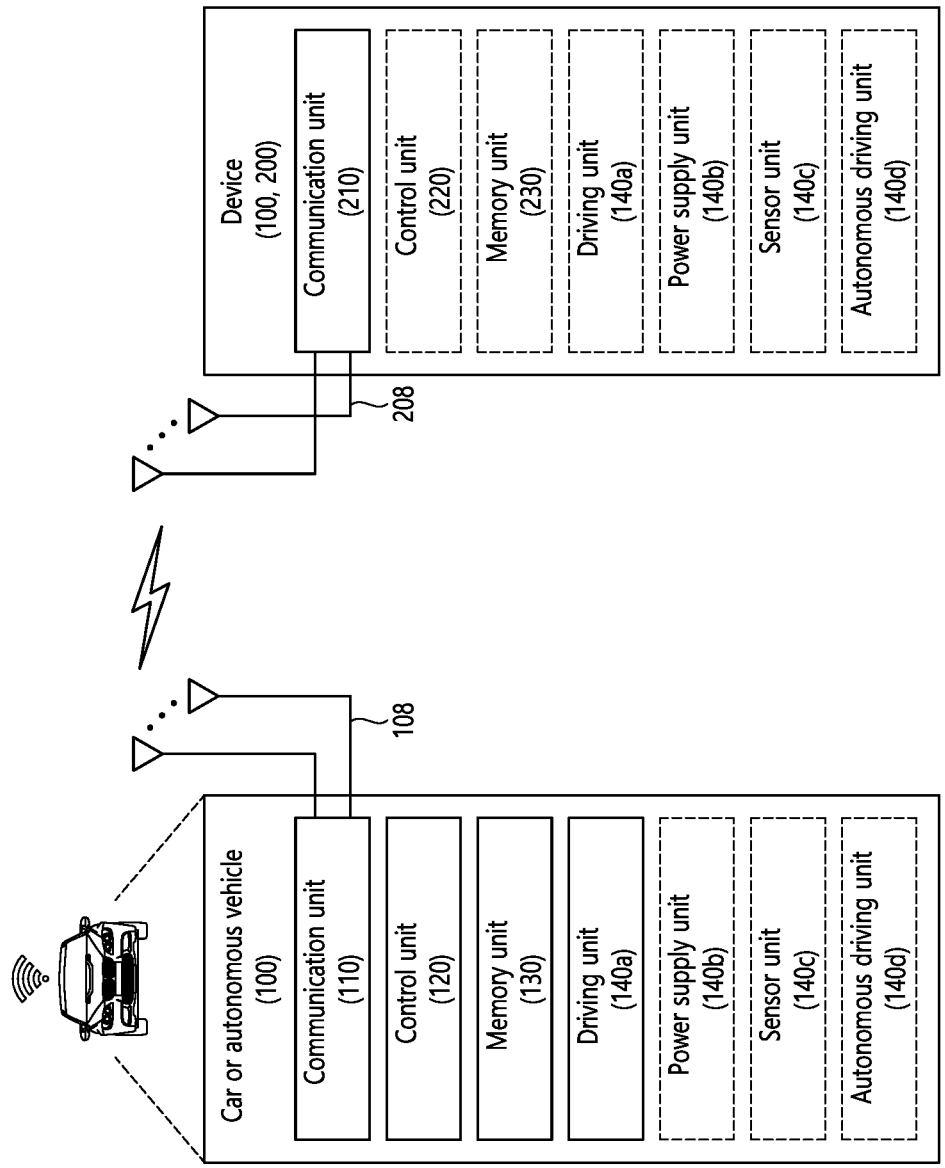
FIG. 32 shows a vehicle or an autonomous vehicle to which the present specification is applied.

FIG. 32 shows a vehicle or an autonomous vehicle to which the present specification is applied. The vehicle or autonomous vehicle may be implemented by a mobile robot, a car, a train, a manned/unmanned Aerial Vehicle (AV), a ship, and so on.

Referring to FIG. 32, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a-140d correspond to the blocks 110/130/140 of FIG. 30, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, and so on. The power supply unit (140b) may supply power to the vehicle or the autonomous vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and so on.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Claims in the present specification may be combined in various ways. For instance, technical features in method claims of the present specification may be combined to be implemented or performed in an apparatus (or device), and technical features in apparatus claims may be combined to be implemented or performed in a method. Further, technical features in method claim(s) and apparatus claim(s) may be combined to be implemented or performed in an apparatus. Further, technical features in method claim(s) and apparatus claim(s) may be combined to be implemented or performed in a method.

What is claimed is:

1. A method for an integrated access and backhaul (IAB) node, the method comprising:
    performing an initial access procedure with a parent node;
    transmitting a group index of a child IAB node of the IAB node to the parent node, wherein the child IAB node is included in a group comprising child IAB nodes having a same uplink reception timing;
    receiving, from the parent node, uplink reception timing information for the child IAB node, wherein the child IAB node includes a child IAB-mobile terminal (MT) and a child IAB-distributed unit (DU);
    transmitting the uplink reception timing information to the child IAB node; and
    communicating with the child IAB node based on the uplink reception timing information,
    wherein the uplink reception timing information specifies time resources in which the child IAB node can perform simultaneous reception operations of the child IAB-MT and the child IAB-DU,
    wherein a reception operation of the child IAB-MT is an operation in which the child IAB-MT receives a signal from the IAB node, and
    wherein a reception operation of the child IAB-DU is an operation in which the child IAB-DU receives a signal from a user equipment (UE).

2. The method of claim 1, wherein the child IAB node is an IAB node that applies different uplink reception timing according to each time resource among a plurality of time resources.

3. The method of claim 1, wherein the uplink reception timing information is transmitted through F1-AP (Application Protocol) signaling.

4. An Integrated Access and Backhaul (IAB) node comprising:
    at least one transceiver;
    at least one memory; and
    at least one processor operatively coupled with the at least one memory and the at least one transceiver, wherein the at least one memory stores instructions that, based on being executed by the at least one processor, cause the at least one processor to perform operations comprising:
    performing an initial access procedure with a parent node;
    transmitting a group index of a child IAB node of the IAB node to the parent node, wherein the child IAB node is included in a group comprising child IAB nodes having a same uplink reception timing;
    receiving, from the parent node, uplink reception timing information for the child IAB node, wherein the child IAB node includes a child IAB-mobile terminal (MT) and a child IAB-distributed unit (DU);
    transmitting the uplink reception timing information to the child IAB node; and
    communicating with the child IAB node based on the uplink reception timing information,
    wherein the uplink reception timing information specifies time resources in which the child IAB node can perform simultaneous reception operations of the child IAB-MT and the child IAB-DU,
    wherein a reception operation of the child IAB-MT is an operation in which the child IAB-MT receives a signal from the IAB node, and
    wherein a reception operation of the child IAB-DU is an operation in which the child IAB-DU receives a signal from a user equipment (UE).

5. An apparatus comprising:
    at least one memory; and
    at least one processor operatively coupled with the at least one memory,
    wherein the at least one memory stores instructions that, based on being executed by the at least one processor, cause the at least one processor to perform operations comprising:
    performing an initial access procedure with a parent node;
    transmitting a group index of a child IAB node of the IAB node to the parent node, wherein the child IAB node is included in a group comprising child IAB nodes having a same uplink reception timing;
    receiving, from the parent node, uplink reception timing information for the child IAB node, wherein the child IAB node includes a child IAB-mobile terminal (MT) and a child IAB-distributed unit (DU);
    transmitting the uplink reception timing information to the child IAB node; and
    communicating with the child IAB node based on the uplink reception timing information,
    wherein the uplink reception timing information specifies time resources in which the child IAB node can perform simultaneous reception operations of the child IAB-MT and the child IAB-DU,
    wherein a reception operation of the child IAB-MT is an operation in which the child IAB-MT receives a signal from the IAB node, and wherein a reception operation of the child IAB-DU is an operation in which the child IAB-DU receives a signal from a user equipment (UE).

\* \* \* \* \*